US008712023B2

(12) United States Patent
Mulla et al.

(10) Patent No.: US 8,712,023 B2
(45) Date of Patent: Apr. 29, 2014

(54) METHODS AND SYSTEMS FOR AGGREGATING AND GRAPHICALLY REPRESENTING INFORMATION ASSOCIATED WITH A TELECOMMUNICATIONS CIRCUIT

(75) Inventors: Tahir G. Mulla, Tampa, FL (US); Sai S. Vasanadu, Tampa, FL (US); Syed Raza, Carrollton, TX (US); Senthil K. Chandrasekaran, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 364 days.

(21) Appl. No.: 12/952,342

(22) Filed: Nov. 23, 2010

(65) Prior Publication Data

US 2012/0128139 A1 May 24, 2012

(51) Int. Cl.
*H04M 11/00* (2006.01)

(52) U.S. Cl.
USPC .................................................. 379/93.17

(58) Field of Classification Search
USPC ................... 379/220.1, 247, 93.017
See application file for complete search history.

(56) References Cited

U.S. PATENT DOCUMENTS

| 5,926,463 | A  | * | 7/1999  | Ahearn et al. ............... 370/254 |
|-----------|----|---|---------|--------------------------------------|
| 6,225,999 | B1 | * | 5/2001  | Jain et al. ....................... 715/734 |
| 6,549,940 | B1 | * | 4/2003  | Allen et al. .................... 709/219 |
| 7,149,975 | B1 | * | 12/2006 | Johnson et al. ............... 709/224 |
| 7,392,482 | B2 | * | 6/2008  | Firebaugh et al. ............. 709/224 |
| 7,675,862 | B2 | * | 3/2010  | Pham et al. .................... 370/241 |
| 7,882,439 | B2 | * | 2/2011  | Elman et al. .................. 715/736 |
| 8,392,601 | B2 | * | 3/2013  | Blackwell et al. ............ 709/236 |
| 8,406,903 | B2 | * | 3/2013  | Mitamura et al. ............. 715/736 |
| 2003/0112958 | A1 | * | 6/2003 | Beaudoin et al. ........ 379/221.15 |
| 2004/0136517 | A1 | * | 7/2004 | Bjornberg et al. ....... 379/220.01 |
| 2007/0043826 | A1 | * | 2/2007 | Elman et al. .................. 709/217 |

* cited by examiner

*Primary Examiner* — Maria El-Zoobi

(57) ABSTRACT

Exemplary systems and methods for aggregating and graphically representing information associated with a telecommunications circuit are disclosed. An exemplary method includes a telecommunications management subsystem receiving, from a plurality of backend telecommunications subsystems, data representative of information associated with a telecommunications circuit, aggregating the data representative of the information associated with the telecommunications circuit, providing a portal configured for access by a user associated with the telecommunications circuit, and displaying, within the portal, a graphical user interface including a graphical representation of the telecommunications circuit. Corresponding methods and systems are also disclosed.

25 Claims, 19 Drawing Sheets

METHODS AND SYSTEMS FOR AGGREGATING AND GRAPHICALLY REPRESENTING INFORMATION ASSOCIATED WITH A TELECOMMUNICATIONS CIRCUIT

BACKGROUND INFORMATION

Telecommunications are fundamental in today's society. For example, the telecommunications industry has grown from somewhat meager beginnings including telegraph communications to a multi-trillion dollar industry including global telecommunications networks, such as television networks and the Internet.

In order to provide today's telecommunications services, a large number of telecommunications systems are required. For example, a particular telecommunications services provider may utilize any number of backend provisioning, ordering, design, and/or management systems to provide one or more telecommunications services to its customers. Each backend telecommunications system may be associated with and store data corresponding to a particular aspect of a telecommunications service, a particular portion of a telecommunications network, a particular network device or group of network devices, and/or any other facet of a telecommunications service. Unfortunately, however, because many backend telecommunications systems may be incapable of exchanging data with each other, the data associated with a particular telecommunications service, network, or customer may be disjointedly spread (e.g., stored) across a plurality of telecommunications systems and corresponding locations. This makes it difficult to access a complete set of data associated with a particular service, network, or customer. As a result, customers may be uninformed about the services they pay for and utilize, and service providers may be unable to efficiently analyze and monitor the services they provide.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
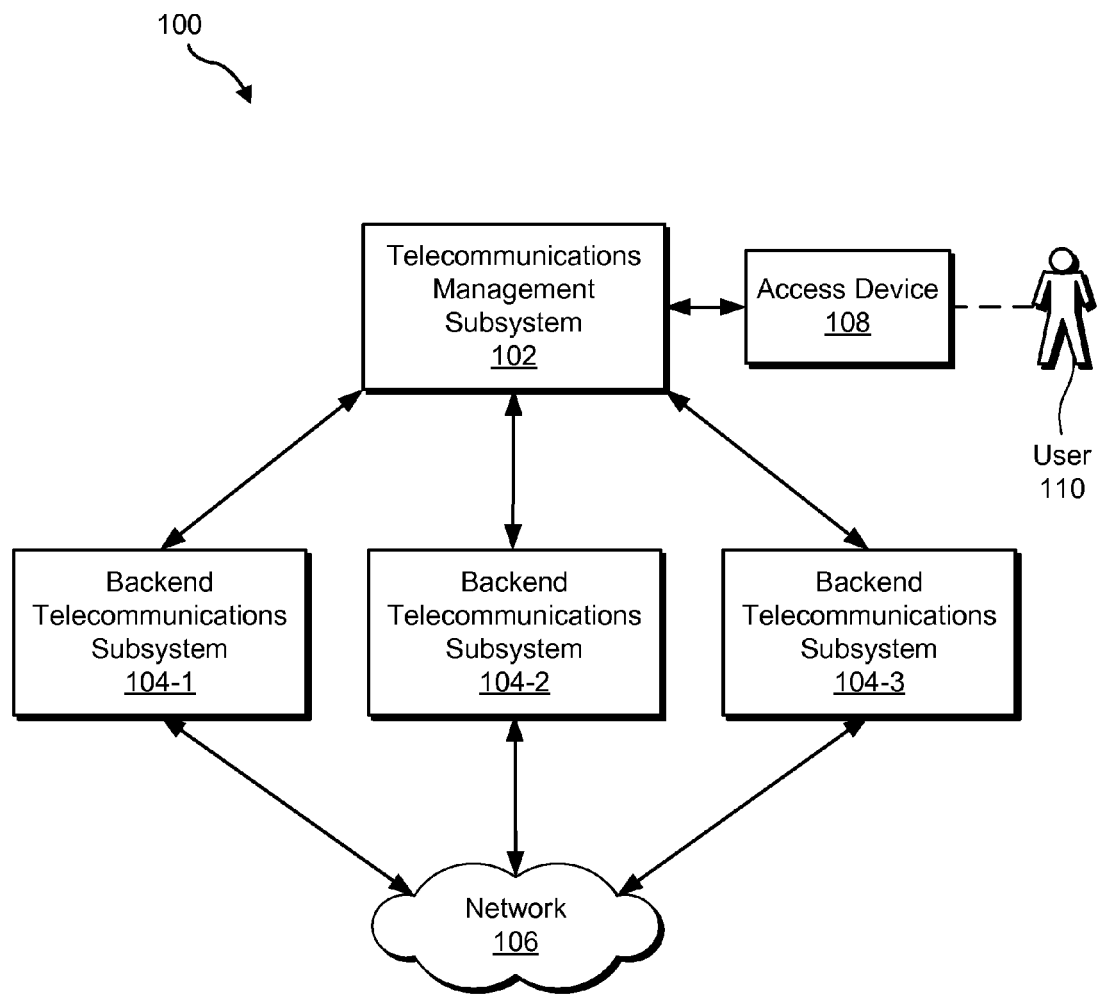
FIG. 1 illustrates an exemplary telecommunications management system according to principles described herein.

Exemplary methods and systems for aggregating and graphically representing information associated with a telecommunications circuit are described herein. In some examples, a telecommunications management subsystem receives, from a plurality of backend telecommunications subsystems, data representative of information associated with a telecommunications circuit between a first endpoint at a first geographic location and a second endpoint at a second geographic location. The telecommunications management subsystem may be further configured to aggregate the data representative of the information associated with the telecommunications circuit, provide a portal configured for access by a user, and display, within the portal, a graphical user interface including a graphical representation of the telecommunications circuit, as will be explained in more detail below.

The systems and methods described herein may be configured to aggregate data across different layers and subsystems of a telecommunications network for convenient reference by telecommunications service providers and/or end users. To illustrate, a telecommunications service provider may utilize a plurality of heterogeneous backend telecommunications subsystems to provide a telecommunications service to a customer. Each backend telecommunications subsystem may perform one or more unique operations and/or store a unique set of data associated with the telecommunications service. In some examples, the backend telecommunications subsystems may be incapable of exchanging data with each other (e.g., each backend telecommunications subsystem may operate within its own boundaries, cloud(s), and/or information silo(s)). As a result, the complete set of data representative of information associated with the telecommunications service is stored in fragments across the plurality of backend telecommunications subsystems.

To remedy the foregoing problem, the systems and methods described herein may be configured to aggregate the data associated with a telecommunications service and make a complete set of date available for access by telecommunications service providers and/or end users. For example, the systems and methods described herein may be configured to receive and aggregate data from a plurality of backend telecommunications subsystems, and then provide and/or display the aggregated data for convenient access by way of an access portal. A user (e.g., a customer or a telecommunications service provider) may utilize the access portal to, for example, verify a status of a telecommunications service, identify one or more problems with a telecommunications service, view a graphical representation of a telecommunications circuit, drill down/up through information associated with a telecommunications circuit, and/or access any other suitable information and/or options associated with a telecommunications service, as will be explained in more detail below.

As used herein, "telecommunications" and "telecommunications services" may refer to the transmission of signals (e.g., communication signals, data signals, media signals, etc.) between two locations. Exemplary telecommunications services may include telephone services (e.g., analog telephone services, Voice over Internet Protocol telephone services, etc.), radio services, television services, computer network services, Internet services, and/or any other suitable telecommunications services.

Telecommunications services may be provided using one or more telecommunications networks each including any suitable number of telecommunications circuits. As used herein, the terms "telecommunications circuit" and "circuit" may refer to any line, link, conductor, conduit, path, and/or channel by which a telecommunications signal may be transmitted between any two points within a telecommunications network. A telecommunications circuit may utilize any suitable communication technologies, devices, networks, media, and protocols supportive of remote data communications, such as those disclosed herein.

A telecommunications circuit may provide a communication path between a first endpoint located at a first geographic location and a second endpoint located at a second geographic location. In some examples, the communication path may include any suitable number of network elements (e.g., networking devices such as gateways, routers, bridges, switches, digital cross connect devices, hubs, repeaters, multiplexers, modems, etc.), nodes (e.g., connection points, redistribution points, and/or endpoints), and/or circuit segments (e.g., portions of the communication path connecting successive nodes).

A telecommunication circuit may be associated with a particular layer(s) of the open systems interconnection ("OSI") model. For example, a telecommunications circuit may be configured to provide one or more layer 1 (or "physical layer") services (e.g., the transmission of optical or electrical signals), layer 2 (or "data link layer") services, layer 3 (or "network layer") services, layer 4 (or "transport layer") services, layer 5 (or "session layer") services, layer 6 (or "presentation layer") services, layer 7 (or "application layer") services, and/or combinations/hybrids thereof (e.g., layer 2/3 services). Additionally or alternatively, a telecommunications circuit may be associated with and/or configured to provide any suitable bandwidth/transmission rate (e.g., DS0, T1/DS1, T3/DS3, 1 Gigabit Ethernet, 10 Gigabit Ethernet, OC-3, OC-12, OC-48, OC-192, or any other suitable bandwidth/transmission rate).

At least a portion of a telecommunications circuit may carry and/or facilitate one or more other circuits (e.g., rider circuits). For example, a layer 1 circuit may carry one or more other layer 1 circuits and/or Layer 2+ circuits. To illustrate, an OC-12 circuit may carry one or more DS3 circuits, a DS1 circuit may carry one or more DS0 circuits, a DS0 circuit may carry one or more layer 2/3 circuits, and so on.

Similarly, at least a portion of a telecommunications circuit may ride on (e.g., be carried by) one or more other telecommunications circuits (e.g., carrier circuits, backbone circuits, etc.). To illustrate, a DS0 circuit may at least partially ride on a DS1 circuit, a DS1 circuit may at least partially ride on a DS3 circuit, a DS3 circuit may at least partially ride on an OC-12 circuit, and so on.

A telecommunications circuit may be a dedicated/private circuit, a switched circuit, a shared circuit, a virtual circuit, a physical circuit, a full circuit, a fractional circuit, a channelized circuit, and/or a circuit of any other suitable structure or configuration. A telecommunications circuit may be of any suitable circuit type (e.g., a user network interface ("UNI") circuit, a network to network interface ("NNI") circuit, a permanent virtual circuit ("PVC"), a ring circuit, a transport circuit, and/or any other suitable type of circuit) and/or associated with any suitable service type or sub type (e.g., an asynchronous transfer mode ("ATM") circuit, a frame circuit, private internet protocol ("PIP") circuit, public IP circuit, an Ethernet circuit, and/or a circuit of any other suitable service type and/or sub type).

A telecommunications circuit may be confined to a single local access transport area ("LATA") or may span a plurality of LATAs. For example, a telecommunications circuit may connect a first endpoint located within a first LATA to a second endpoint located within a second LATA. Accordingly, the telecommunications circuit may have a first portion that is provisioned by a first local exchange carrier ("LEC" or "local service provider") associated with the first LATA, a second portion that is provisioned by a second LEC associated with the second LATA, and a third portion that is provisioned by an interexchange carrier (or "long distance service provider") and that connects the first portion to the second portion.

A telecommunications circuit may be ordered, provisioned, activated, controlled, and/or managed by one or more backend telecommunications subsystems. As used herein, the term "backend telecommunications subsystem" may refer to any suitable devices, systems, and/or subsystems configured to perform one or more operations to provision, manage, design, monitor, activate, analyze, control, troubleshoot, and/or maintain data associated with one or more telecommunications circuits. For example, a backend telecommunications subsystem may be a backend provisioning subsystem, a backend ordering subsystem, a backend network management subsystem, a backend network design subsystem, a backend service profile subsystem, or any other suitable backend telecommunications subsystem.

A backend telecommunications subsystem may be associated with a particular layer of services (e.g., layer 1 services, layer 2 services, etc.), a particular telecommunications service provider (e.g., a particular LEC or interexchange carrier), a particular location or region (e.g., a particular LATA), and/or any other suitable aspect of a telecommunications service.

As mentioned above, a backend telecommunications subsystem may maintain data in accordance with a distinct data model (or schema) and/or may be incapable of exchanging data with one or more other backend telecommunications subsystems. In some examples, a backend telecommunications subsystem may operate in a distinct, heterogeneous information silo while other backend telecommunications subsystems operate in other distinct, heterogeneous information silos.

A plurality of backend telecommunications subsystem may be configured to provide one or more telecommunications services and/or circuits to a customer. To illustrate, a backend ordering subsystem may perform one or more operations to facilitate the ordering of a telecommunications circuit by the customer, a backend design subsystem may perform one or more operations to facilitate the design of the ordered telecommunications circuit (e.g., maintain data associated with a plurality of available network devices by which the ordered telecommunications circuit may be provisioned), a backend layer 1 provisioning subsystem may perform one or more operations to provision one or more layer 1 services for the ordered telecommunications circuit, a backend layer 2/3 provisioning subsystem may perform one or more operations to provision one or more layer 2/3 services for the ordered telecommunications circuit, a backend network management subsystem may perform one or more operations to manage the ordered telecommunications circuit, and/or a backend trouble-ticketing subsystem may perform one or more operations to address any trouble tickets and/or problems associated with the ordered telecommunications circuit.

FIG. 1 illustrates an exemplary telecommunications management system (or simply "system 100") wherein a telecommunications management subsystem 102 is communicatively coupled to backend telecommunications subsystems 104-1 through 104-3 (collectively referred to herein as "backend telecommunications subsystems 104"). System 100 may further include an access device 108 that is configured to allow a user 110 to access a portal provided by telecommunications management subsystem 102, as will be explained in more detail below. Although FIG. 1 illustrates three backend telecommunications subsystems 104, it will be understood that telecommunications management subsystem 102 may be in communication with any suitable number of additional and/or alternative backend telecommunications subsystems.

Telecommunications management subsystem 102 and backend telecommunications subsystems 104 may be configured to communicate using any suitable communication technologies, devices, networks, media, and protocols supportive of remote data communications. For example, telecommunications management subsystem 102 and backend telecommunications subsystems 104 may communicate using any communication platforms and technologies suitable for transporting content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, in-band and out-of-band signaling technologies, and other suitable communications technologies.

Backend telecommunications subsystems 104 may be configured to provide one or more telecommunications services and/or circuits to one or more customers by way of network 106. Network 106 may include one or more networks and/or types of networks (and communication links thereto). For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks.

Telecommunications management subsystem 102 may include one or more computing devices (e.g., servers, personal computers, or other network-enabled devices) configured to execute computer-executable instructions (e.g., software applications) in order to perform one or more functions associated with telecommunications management subsystem 102. For example, telecommunications management subsystem 102 may include one or more servers and/or other computing devices configured to receive data representative of information associated with a telecommunications circuit from backend telecommunications subsystems 104, aggregate the data representative of the information associated with the telecommunications circuit, provide a portal configured for access by user 110, and display, within the portal, a graphical user interface including the information associated with the telecommunications circuit and a graphical representation of the telecommunications circuit.

Likewise, backend telecommunications subsystems 104 may each include one or more computing devices (e.g., servers, personal computers, or other network-enabled devices) configured to perform one or more of the functions disclosed herein.

In some examples, as shown in FIG. 1, telecommunications management subsystem 102 may include or be in communication with an access device 108 configured to access information maintained by and/or to control one or more operations of telecommunications management subsystem 102. For example, access device 108 may be configured to display a portal provided by telecommunications management subsystem 102 to a user 110 (e.g., an end user or administrator). In some examples, the portal may be configured to allow user 110 to access data maintained by telecommunications management subsystem 102 including data representative of information associated with one or more telecommunication circuits, as will be explained in more detail below. Access device 108 may include any suitable computing device such as, but not limited to, a personal computer, a communications device, a mobile device (e.g., a mobile phone device), a handheld device, and/or any other suitable computing device.

Additionally or alternatively, backend telecommunications subsystems 104 may each include or be in communication with one or more additional access devices configured to facilitate access to and/or use of backend telecommunications subsystems 104. For example, an operator may use an access device associated with backend telecommunications subsystems 104 to perform one or more actions associated with a telecommunications service.

Figure 2:
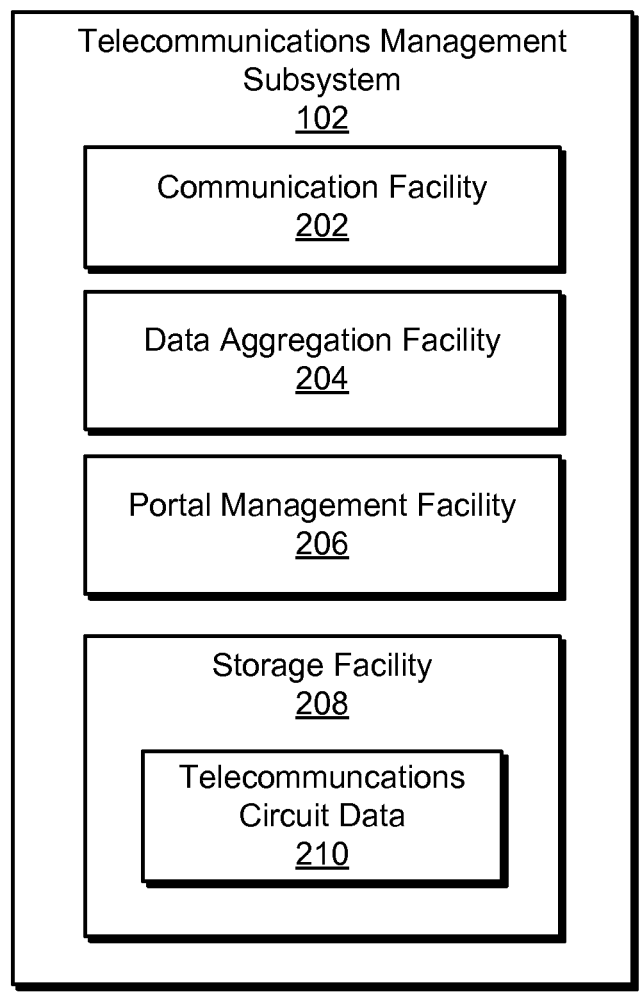
FIG. 2 illustrates an exemplary telecommunications management subsystem of the system of FIG. 1 according to principles described herein.

FIG. 2 illustrates exemplary components of telecommunications management subsystem 102. As mentioned above and as will be described in more detail below, telecommunications management subsystem 102 can be configured to facilitate management and presentation of one or more telecommunications circuits. For example, telecommunications management subsystem 102 can be configured to facilitate the aggregation and graphical display of information associated with telecommunications circuits. Telecommunications management subsystem 102 may include, but is not limited to, a communication facility 202, a data aggregation facility 204 (or "aggregation facility 204"), a portal management facility 206, and a storage facility 208, which may be in communication with one another using any suitable communication technologies. It will be recognized that although facilities 202-208 are shown to be separate facilities in FIG. 2, any of those facilities may be combined into a single facility or split into additional facilities as may serve a particular implementation. Facilities 202-208 will now be described in more detail.

Communication facility 202 is configured to facilitate communication between telecommunications management subsystem 102 and one or more computing devices (e.g., one or more computing devices associated with or included within backend telecommunications subsystems 104). For example, communication facility 202 may be configured to facilitate communication between backend telecommunications subsystems 104 and one or more servers, databases, and/or other components that implement at least a portion of telecommunications management subsystem 102. In some examples, communication facility 202 may be configured to receive data from backend telecommunications subsystems 104 representative of information associated with one or more telecommunications circuits. Additionally or alternatively, communication facility 202 may be configured to receive information updates (e.g., data representative of changes to information) associated with one or more telecommunications circuits. For example, communication facility 202 may receive information updates from backend telecommunications subsystems 104 at a predetermined frequency (e.g., real-time, hourly, daily, etc.).

The information received from backend telecommunications subsystems 104 may include any suitable Information associated with a particular telecommunications circuit. For example, the information associated with the telecommunications circuit may include information associated with one or more service layer(s) of the telecommunications circuit, a type and/or sub-type of the telecommunications circuit, a service type of the telecommunications circuit, one or more network elements (e.g., network devices) utilized by the telecommunications circuit, one or more sites (or "locations") associated with the telecommunications circuit (e.g., sites associated with nodes within the telecommunications circuit), one or more LATAs associated with the telecommunications circuit, one or more service providers associated with the telecommunications circuit, one or more backend telecommunications subsystems 104 associated with the telecommunications circuit, a status of the telecommunications circuit, one or more circuits that carry the telecommunications circuit, one or more circuits that ride on the telecommunications circuit, one or more circuit segments within the telecommunications circuit, a bandwidth of the telecommunications circuit, customer information associated with the telecommunications circuit (e.g., contact information), order information associated with the telecommunications circuit, one or more attributes associated with the telecommunications circuit, and/or any other suitable information associated with the telecommunications circuit, as will be explained in more detail below.

Communication facility 202 may be configured to direct data received from backend telecommunications subsystems 104 to one or more other components of telecommunications management subsystem 102. For example, communication facility 202 may be configured to direct data received from backend telecommunications subsystems 104 to aggregation facility 204, portal management facility 206, and/or storage facility 208.

Aggregation facility 204 may be configured to aggregate data representative of information associated with one or more telecommunications circuits. For example, aggregation facility 204 may be configured to aggregate and/or stitch the data received from backend telecommunications subsystems 104 by way of communication facility 102. Aggregation facility 204 may be configured to aggregate the data in any suitable manner as may serve a particular implementation.

In some examples, aggregation facility 204 may be configured to integrate data from a plurality of distinct data models/ schemas into a common data model/schema. To illustrate, each of backend telecommunications subsystems 104 may maintain data in accordance with a unique data model that is at least partially incompatible with the data models utilized by the other backend telecommunications subsystems 104. For example, backend telecommunication subsystem 104-1 may maintain data in accordance with a first distinct data model, backend telecommunications subsystem 104-2 may maintain data in accordance with a second distinct data model, and backend telecommunications subsystem 104-3 may maintain data in accordance with a third distinct data model. Aggregation facility 204 may be configured to process, merge, translate, and/or convert the data received from backend telecommunications subsystems 104 from the three distinct data models into a common data model. As will be explained in more detail below, the aggregated data may then be used to provide a unified view of information associated with a telecommunications circuit to a user.

Aggregation facility 204 may be configured to horizontally and/or vertically aggregate data representative of information associated with a telecommunications circuit. For example, aggregation facility 204 may be configured to aggregate data horizontally across a plurality of network elements, nodes, circuit segments, and/or sites associated with the telecommunications circuit. To illustrate, aggregation facility 204 may horizontally aggregate data representative of information associated with a first endpoint of a telecommunications circuit, data representative of information associated with a second endpoint of the telecommunications circuit, and/or data representative of information associated with one or more network elements, circuit segments, and/or intermediate nodes traversed by the telecommunications circuit. Additionally or alternatively, aggregation facility 204 may be configured to aggregate data vertically across a plurality of service layers and/or corresponding telecommunications circuits. To illustrate, aggregation facility 204 may vertically aggregate data representative of one or more layer 1 services and/or circuits, layer 2 services and/or circuits, layer 3 services and/or circuits, and/or layer 4 services and/or circuits associated with the telecommunications circuit.

In some examples, aggregation facility 204 may utilize unique identification information to accurately aggregate data. For example, each telecommunications circuit may be associated with a unique circuit identifier (or "circuit ID"). Similarly, each circuit segment, network element, and/or site utilized by the telecommunications circuit may be associated with a corresponding unique identifier. Accordingly, any data associated with the telecommunications circuit, including data associated with each corresponding circuit segment, network element, and/or site, may be maintained by backend telecommunications subsystems 104 and/or transmitted to telecommunications management subsystem 102 in association with the corresponding unique identifier(s) (e.g., each piece of data may reference and/or be grouped with the corresponding unique identifier). Aggregation facility 204 may then utilize the unique identifiers to determine how to properly aggregate the received data.

Once data has been aggregated by aggregation facility 204, the aggregated data may be presented to and/or utilized by an end user (e.g., a customer) and/or a service provider to manage, analyze, monitor, and/or access information associated with a corresponding telecommunications circuit, as will be explained in more detail below.

Portal management facility 206 may be configured to generate, manage, provide, and/or display a portal configured to include information and/or options associated with one or more telecommunications circuits. For example, portal management facility 206 may be configured to provide a portal for display on an access device (e.g., access device 108) and configured to allow a user (e.g., user 110) to access data received by communication facility 202 and/or aggregated by aggregation facility 204, as will be explained in more detail below.

In some examples, portal management facility 206 may be configured to display, within the portal, one or more graphical user interfaces ("GUIs") by way of which a user may navigate and/or access the information associated with a telecommunications circuit. The GUIs may display any suitable information and/or options associated with the telecommunications circuit. In some examples, the GUIs may display one or more graphical representations of a telecommunications circuit, as will be explained in more detail below.

Portal management facility 206 may configure the portal to allow a user to drill down and/or up through data associated with a telecommunications circuit. For example, the portal may be configured to allow a user to drill down and/or up through layers of data associated with distinct service layers. Additionally or alternatively, the portal may be configured to allow a user to drill down through carrier circuits upon which a particular telecommunications circuit rides and/or drill up through rider circuits that a particular telecommunications circuit carries. The portal may be further configured to allow a user to drill down/up through data associated with a particular piece of equipment (e.g., a network element). For example, the portal may be configured to allow a user to drill down/up through data associated with one or more racks, shelves, slots, cards, and/or ports of the particular piece of equipment. The portal may be configured to allow the user to drill down and/or up through the data associated with the telecommunications circuit in any suitable manner, as will be explained in more detail below.

Storage facility 208 may be configured to maintain telecommunications circuit data 210 representative of information associated with one or more telecommunications circuits, such as data received from backend telecommunications subsystems 104 and/or aggregated by aggregation facility 204. It will be recognized that storage facility 208 may maintain additional or alternative data as may serve a particular implementation.

FIGS. 3-16 illustrate exemplary views of a portal that may be provided, generated, managed, and/or displayed by portal management facility 206. As will be described in more detail below, a user may utilize the exemplary portal shown in FIGS. 3-16 to manage, monitor, analyze, and/or access information associated with one or more telecommunications circuits. It will be recognized that the exemplary views shown in FIGS. 3-16 are merely illustrative and that they may be modified, redacted, or added to in any way as may serve a particular implementation. For example, the information, options, graphical indicia, tabs, and display windows shown in FIGS. 3-16 may be modified, redacted, and/or added to in any suitable way. In addition, although illustrative telecommunications circuits are represented by the information displayed in FIGS. 3-16, the portal may be configured to display information associated with any suitable telecommunications circuit, such as disclosed herein.

Figure 3:
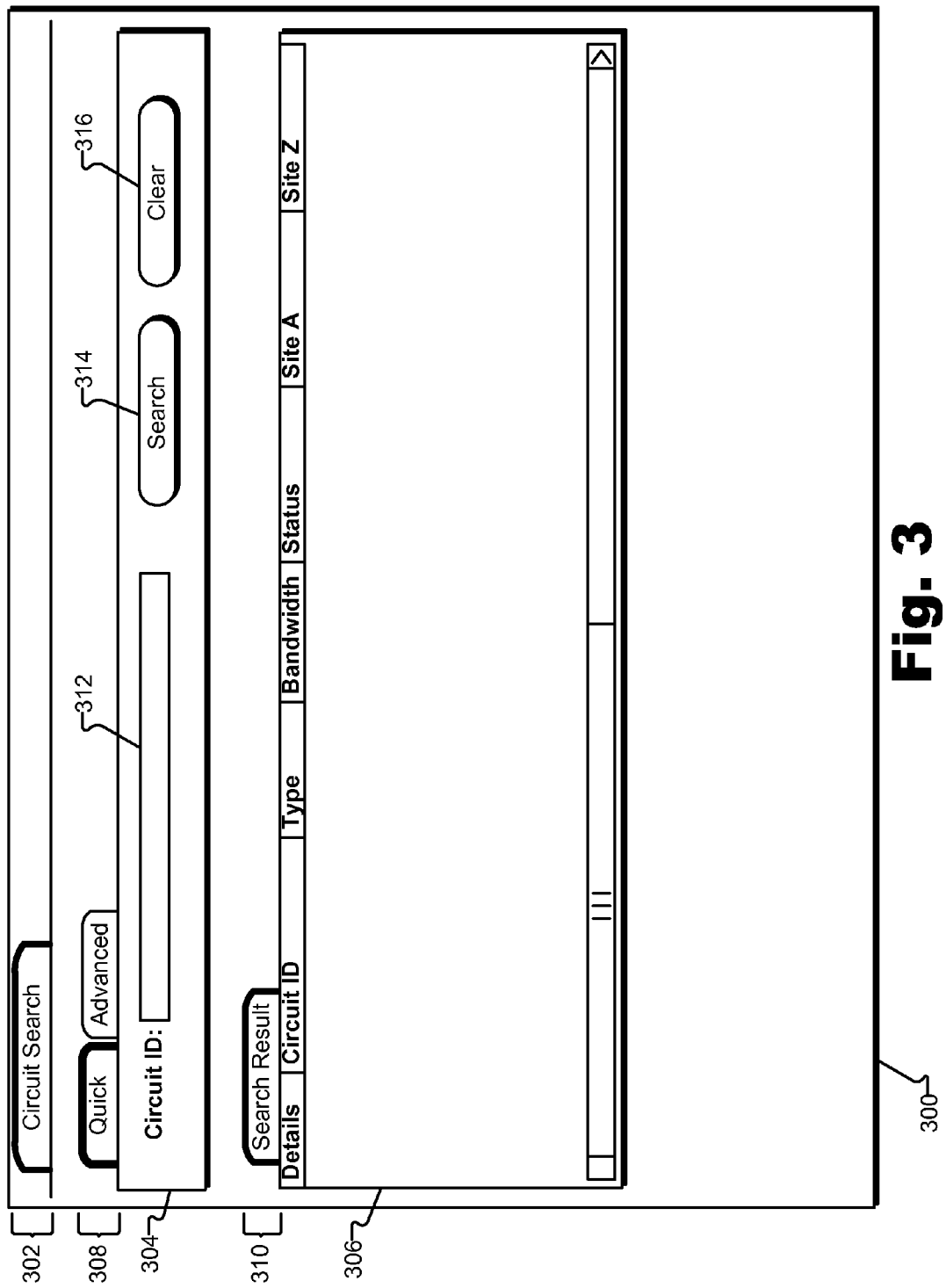
FIGS. 3-16 illustrate various views of an exemplary portal that may be configured to facilitate telecommunications management according to principles described herein.

FIG. 3 illustrates a view of an exemplary portal 300 that may be generated and/or provided by portal management facility 206 for display on a display screen of an access device (e.g., access device 108) and that may be configured to facilitate the access of information associated with one or more telecommunications circuits. Portal 300 may be displayed within a web-browser, a stand-alone application, and/or any other application as may serve a particular implementation.

As shown in FIG. 3, portal 300 may include control tabs 302 by way of which a user may navigate between different options and/or information that may be displayed within portal 300. For example, as will be explained in more detail below, a user may utilize control tabs 302 to navigate between and/or access information associated with different telecommunications circuits, network elements, network sites, etc. In some examples, a selected/active tab within control tabs 302 may be highlighted and/or bolded to visually distinguish a selected/active tab from any inactive tabs. In FIG. 3, control tabs 302 only include a "Circuit Search" tab that may be selected by a user to access one or more circuit search options available by way of portal 300. As will be explained in more detail below, in further embodiments, control tabs 302 may include any suitable number of tabs associated with any other suitable options and/or information available by way of portal 300.

As further shown in FIG. 3, portal 300 may include one or more display windows by way of which information and/or selectable options may be displayed to a user. For example, portal 300 includes a first display window 304 and a second display window 306 (collectively referred to herein as "display windows 304 and 306"). Display windows 304 and 306 may be configured to include/display any suitable information (e.g., whether in graphics or text) and/or options associated with a selected/active tab within control tabs 302. Additionally or alternatively, each of display windows 304 and 306 may be associated with one or more tabs by way of which a user may navigate through the different options and/or information available by way of display windows 304 and 306. For example, first display window 304 may be associated with one or more first display tabs 308 and second display window 306 may be associated with one or more second display tabs 310 (collectively referred to herein as "display tabs 308 and 310"). Similar to control tabs 302, selected/active tabs within display tabs 308 and 310 may be highlighted and/or bolded to visually distinguish the selected/active tabs from inactive tabs.

Display tabs 308 and 310 may include any suitable tabs associated with any suitable options and/or information that may be accessed by way of display windows 304 and 306. In some examples, the tabs included within display tabs 308 and 310 may depend on a user's selection within control tabs 302. For example, as shown in FIG. 3, with the "Circuit Search" tab selected within control tabs 302, first display tabs 308 include a "Quick" tab configured to allow a user to perform a quick search by way of first display window 304 and an "Advanced" tab configured to allow a user to perform an advanced search by way of first display window 304.

As shown in FIG. 3, the "Quick" tab within first display tabs 308 is selected/active and, as a result, first display window 304 includes information and options by way of which a user may perform a quick search for one or more telecommunications circuits. For example, first display window 304 includes a form-fillable option 312 by way of which a user may input a particular search criterion (e.g., a "Circuit ID") for which to search. Additionally or alternatively, first display window 304 may include a selectable option 314 configured to allow a user to search for an inputted search criterion and a selectable option 316 configured to allow a user to clear any search criterion inputted into form-fillable option 312.

As further shown in FIG. 3, with the "Circuit Search" tab selected within control tabs 302, second display tabs 310 may include a "Search Results" tab configured to allow a user to view search results (e.g., a listing of telecommunications circuits that satisfy any inputted search criteria) resulting from a search performed by way of first display window 304. Second display window 306 may also include any suitable information associated with the search results. For example, second display window 306 may include a "Circuit ID," a "Type," a "Bandwidth," a "Status," a "Site A" (e.g., the site where the circuit begins), and/or a "Site Z" (e.g., the site where the circuit terminates) for each search result (e.g., telecommunications circuit) listed within second display window 306. As will be explained in more detail below, second display window 306 may additionally or alternatively include one or more selectable options by way of which a user may access additional information associated with a particular search result listed within second display window 306.

Although portal 300 is shown in FIG. 3 including two display windows, one will appreciate that portal 300 may include any suitable number of additional and/or alternative display windows with any suitable number of corresponding display tabs and configured to display any suitable information and/or options, as may serve a particular implementation.

Figure 4:
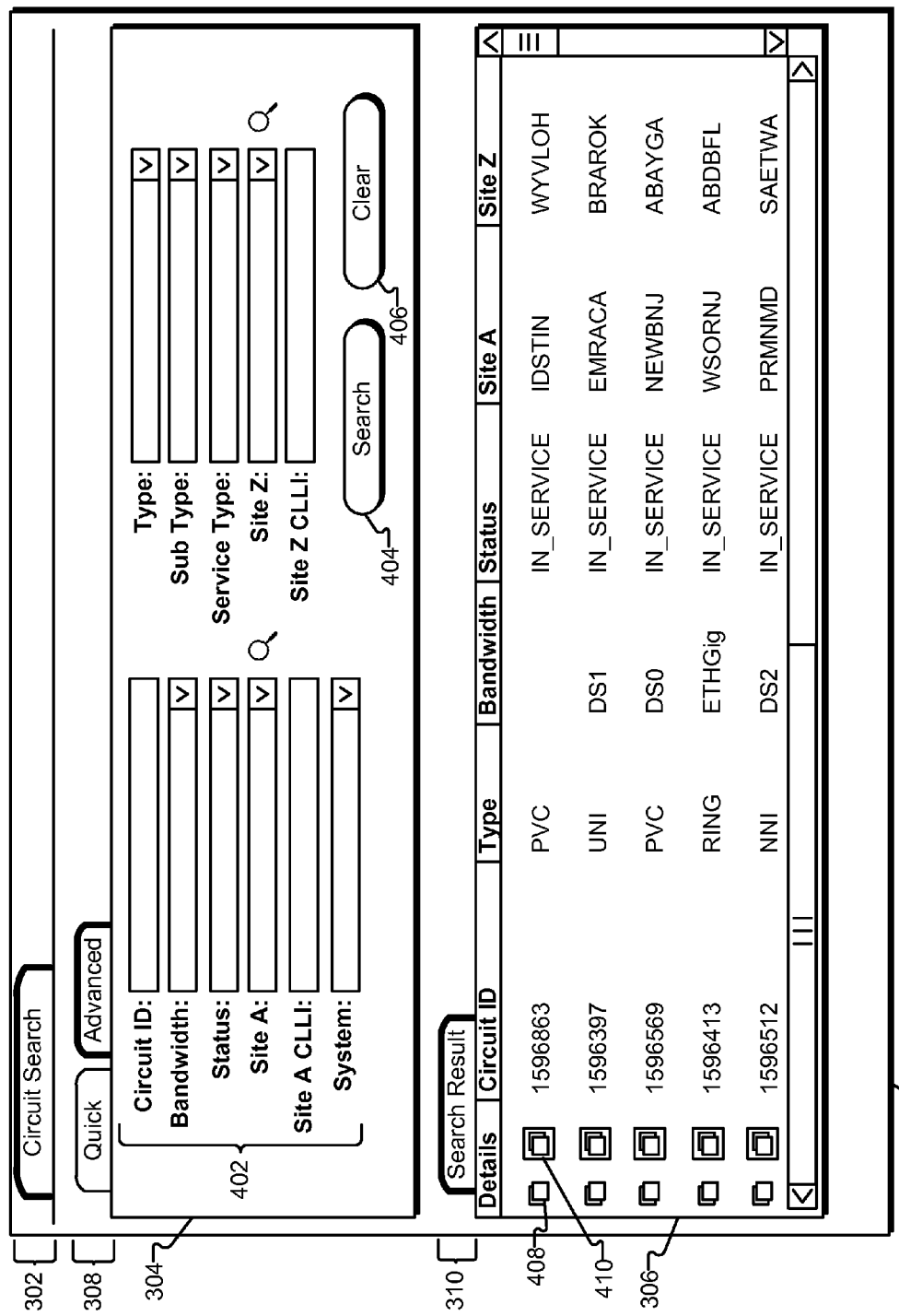

A user may select the "Advanced" tab from first display tabs 308 to perform an advanced search by way of first display window 304. To illustrate, FIG. 4 illustrates an exemplary view of portal 300 with the "Advanced" tab selected/active within first display tabs 308. With the "Advanced" tab selected, first display window 304 now includes options and information configured to allow a user to perform an advanced search by way of first display window 304. For example, first display window 304 includes form-fillable options 402 by way of which a user may input a "Circuit ID," a "Type," a "Bandwidth," a "Sub Type," a "Status," a "Service Type," a "Site A," a "Site Z," a "Site A CLLI" (e.g., a "Common Language Location Identifier Code" for the site where the circuit begins), a "Site Z CLLI" (e.g., a "Common Language Location Identifier Code" for the site where the circuit terminates), and/or a "System" (e.g., a backend telecommunications subsystem that provided the information associated with the circuit) to be used as criteria for a search. First display window 304 may also include selectable options 404 and 406 by way of which a user may search for and/or clear inputted search criteria, respectively.

As mentioned above, in response to a search performed by way of first display window 304, second display window 306 may display information and/or options associated with one or more search results (e.g., one or more telecommunications circuits satisfying the search criteria inputted by way of first display window 304). To illustrate, as shown in FIG. 4, second display window 306 includes a listing of telecommunications circuits resulting from an exemplary search performed by way of first display window 304. As further shown, second display window 306 may include one or more selectable options by way of which a user may access additional details associated with the listed telecommunications circuits. To illustrate, second display window 306 includes a first selectable option 408 and a second selectable option 410 associated with a telecommunications circuit having the circuit ID "1596863" (referred to hereinafter as "circuit 1596863"). In some examples, first selectable option 408 may be configured to allow a user to access additional information associated with circuit 1596863 in an existing window and selectable option 410 may be configured to allow a user to open a new window including the additional information associated with circuit 1596863.

Figure 5:
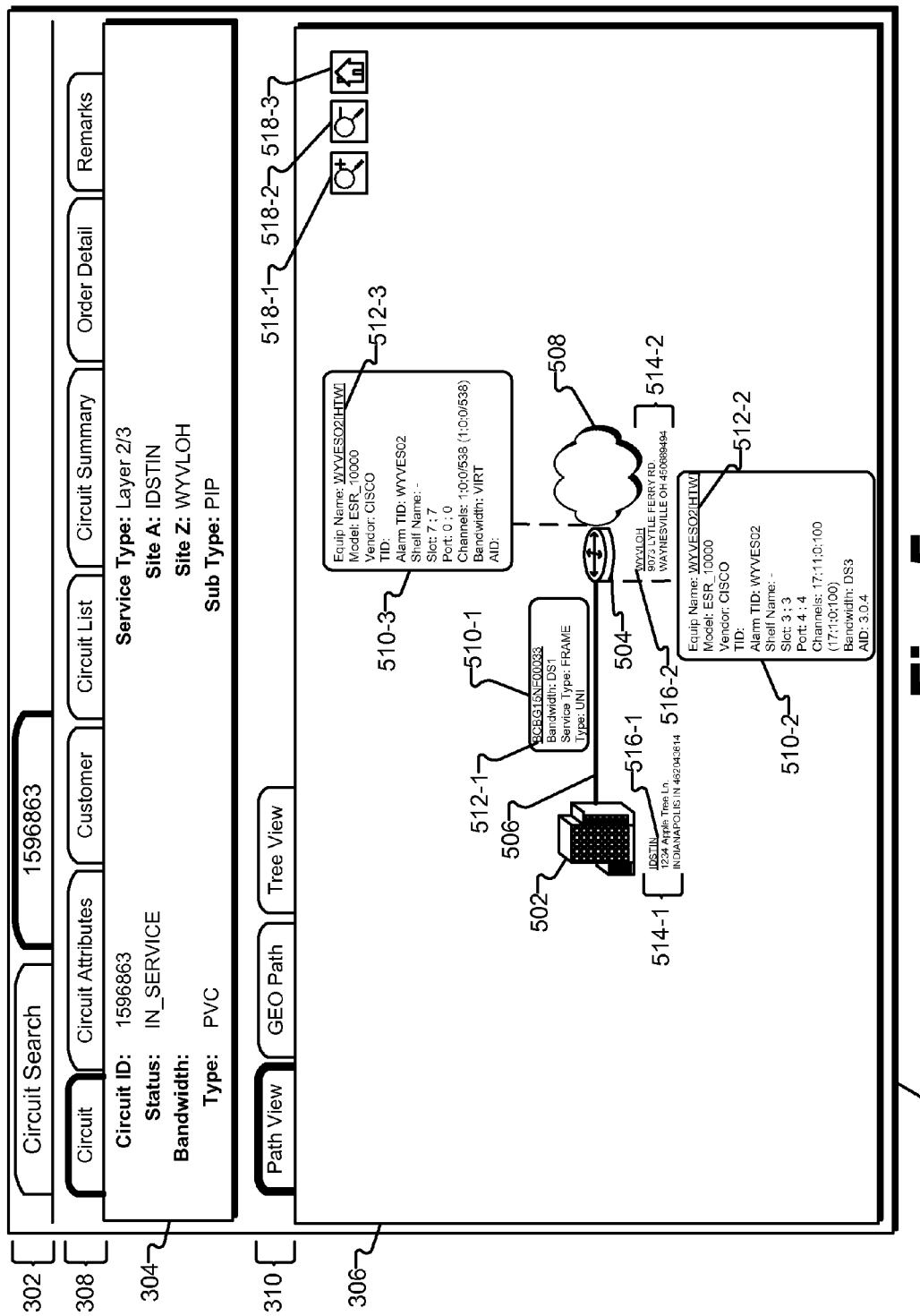

For example, in response to a selection by a user of selectable option 408, portal management facility 206 may open a new tab associated with circuit 1596863 within control tabs 302. To illustrate, FIG. 5 shows an exemplary view of portal 300 in which control tabs 302 now include a "1596863" tab that corresponds to circuit 1596863 and which a user may select to access information and/or options associated with circuit 1596863. As shown in FIG. 5, when the "1596863" tab is selected, display windows 304 and 306 may be configured to include, and display tabs 308 and 310 may be configured to allow a user to navigate, information and/or options associated with circuit 1596863. For example, first display tabs 308 include a "Circuit" tab configured to allow a user to access general information associated with circuit 1596863, a "Circuit Attributes" tab configured to allow a user to access attributes associated with circuit 1596863, a "Customer" tab configured to allow a user to access information associated with a customer associated with circuit 1596863, a "Circuit List" tab configured to allow a user to access a list of telecommunications circuits riding on circuit 1596863, a "Circuit Summary" tab configured to allow a user to access a summary of telecommunications circuits riding on circuit 1596863, an "Order Detail" tab configured to allow a user to access information associated with an order for circuit 1596863, and/or a "Remarks" tab configured to allow a user to access and/or input remarks associated with circuit 1596863. Similar or identical tabs may be included within first display tabs 308 in conjunction with other telecommunications circuits, as explained in more detail below and shown in the accompanying drawings.

As shown in FIG. 5, with the "Circuit" tab selected/active within first display tabs 308, first display window 304 may include any suitable information line items (e.g., categories) and/or corresponding information associated with circuit 1596863. For example, first display window 304 may include a "Circuit ID," a "Status," a "Bandwidth," a "Type," a "Service Type," a "Site A," a "Site Z," and/or a "Sub Type" associated with circuit 1596863. To illustrate, as shown in FIG. 5, circuit 1596863 has a status of "IN_SERVICE," a type of "PVC," a service type of "Layer 2/3," a site A of "IDSTIN," a site Z of "WYVLOH," and a sub type of "PIP."

Second display tabs 310 may similarly include one or more tabs configured to allow a user to navigate information and/or options associated with circuit 1596863 and available by way of second display window 306. As shown, second display tabs 310 include a "Path View" tab configured to allow a user to access a graphical representation of a path of circuit 1596863, a "GEO Path" tab configured to allow a user to access a graphical representation of a geographical path of circuit 1596863, and/or a "Tree View" tab configured to allow a user to access a tree of information associated with circuit 1596863, as will be explained in more detail below. Similar or identical tabs may be included within second display tabs 310 in conjunction with other telecommunications circuits, as explained in more detail below and shown in the accompanying drawings.

As shown in FIG. 5, with the "Path View" tab selected within second display tabs 310, second display window 306 may be configured to include a graphical representation of a communication path traversed by a corresponding circuit (i.e., circuit 1596863). For example, second display window 306 may include graphical indicia of a first endpoint 502 of circuit 1596863 located at a first geographic location (e.g., Indianapolis, Ind.), a second endpoint 504 of circuit 1596863 located at a second geographic location (e.g., Waynesville, Ohio), and a communication path of circuit 1596863 between first endpoint 502 and second endpoint 504. In some examples, the communication path may include one or more circuit segments, nodes, network elements, and/or any other suitable element(s) associated with circuit 1596863. For example, as shown in FIG. 5, the communication path connecting first endpoint 502 and second endpoint 504 includes a circuit segment 506.

First endpoint 502 and second endpoint 504 may represent any suitable endpoints and/or network elements. For example, first endpoint 502 may represent a home or office associated with a customer as well as any corresponding equipment (e.g., a personal computing device, a modem, etc.), and second endpoint 504 may represent a network device associated with a telecommunications service provider (e.g., a provider edge ("PE") router configured to route signals between the telecommunications service provider's network and another network 508, such as the Internet or a telecommunications network associated with another telecommunications service provider).

As further shown in FIG. 5, second display window 306 may display information associated with circuit 1596863. For example, second display window 306 may include one or more information balloons and/or other information associated with circuit 1596863. To illustrate, second display window 306 may include a first information balloon 510-1 associated with circuit segment 506, a second information balloon 510-2 associated with second endpoint 504 (e.g., associated with an ingress port of second endpoint 504), and a third information balloon 510-3 also of second endpoint 504 (e.g., associated with an egress port of second endpoint 504). Information balloons 510-1 through 510-3 (collectively referred to herein as "information balloons 510") may be configured to display any suitable information associated with circuit 1596863.

For example, first information balloon 510-1 may include information associated with circuit segment 506 and/or a carrier circuit (e.g., a layer 1 circuit) that carries circuit segment 506. To illustrate, as shown in FIG. 5, first information balloon 510-1 includes a circuit ID (i.e., "BCBG15NF00033"), a "Trail Bandwidth" (i.e., "DS1"), a "Service Type" (i.e., "FRAME"), and a "Type" (i.e., "UNI") of a carrier circuit that carries circuit segment 506. Additionally or alternatively, first information balloon 510-1 may include a first selectable option 512-1 (e.g., a selectable hyperlink) configured to allow a user to access additional information associated with circuit BCBG15NF00033, as will be explained in more detail below.

Second information balloon 510-2 and third information balloon 510-3 may include any suitable information associated with second endpoint 504. In some examples, second information balloon 510-2 may include information that is specific to a particular ingress/egress port of second endpoint 504 and third information balloon 510-3 may include information that is specific to another particular ingress/egress port of second endpoint 504. As shown, each of second information balloon 510-2 and third information balloon 510-3 may include an "Equipment Name," a "Model," a "Vendor," a Target ID ("TID"), an "Alarm TID," a "Shelf Name," a "Slot," a "Port," "Channels," a "Bandwidth," and an Alarm ID ("AID") associated with second endpoint 504. Additionally or alternatively, second information balloon 510-2 may include a second selectable option 512-2 and third information balloon 510-3 may include a third selectable option 512-3, each configured to allow a user to access additional information associated with second endpoint 504, as will be explained in more detail below.

In some examples, second display window 306 may include information associated with the sites (i.e., locations) of each node within a represented circuit. For example, as shown in FIG. 5, second display window 306 may include first site information 514-1 associated with the site of first endpoint 502 and second site information 514-2 associated with the site of second endpoint 504 (first site information 514-1 and second site information 514-2 are collectively referred to herein as "site information 514"). Each of site information 514-1 and 514-2 may include any suitable information associated with the corresponding site, such as a site name, a site alias, a CLLI, and/or an address. Additionally or alternatively, first site information 514-1 may include a first selectable option 516-1 configured to allow a user to access additional information associated with the site of first endpoint 502 and second site information 514-2 may include a second selectable option 516-2 configured to allow a user to access additional information associated with the site of second endpoint 504, as will be explained in more detail below.

In additional or alternative examples, second display window 306 may include one or more selectable options configured to allow a user to navigate within and/or manipulate a graphical representation of a telecommunications circuit. For example, as shown in FIG. 5, second display window 306 may include selectable options 518-1, 518-2, and 518-3 (collectively referred to herein as "selectable options 518") configured to allow a user to "zoom in" within second display window 306, "zoom out" within second display window 306, and return to a "home" view within second display window 306, respectively.

The exemplary path view included in second display window 306 in FIG. 5 may be illustrative of path views that may be included in second display window 306 for other telecommunications circuits. For example, the path views for other telecommunications circuits may also include graphical indicia of a first endpoint, a second endpoint, and a communication path including one or more circuit segments and/or one or more network elements. The path views of other telecommunications circuits may also include one or more information balloons, site information, and/or one or more corresponding selectable options. Accordingly, the foregoing details presented in conjunction with FIG. 5 may also apply to and may serve as a background for any additional path views illustrated in the subsequent drawings. In some examples, identical or similar reference numbers may designate identical or similar elements.

As mentioned above, portal 300 may be configured to allow a user to drill down/up through data associated with a telecommunications circuit. In some examples, portal 300 may be configured to allow a user to drill down/up through different service layers and/or telecommunications circuits. For example, a user may utilize portal 300 to drill down through one or more telecommunications circuits that facilitate and/or carry circuit 1596863. For example, a user may select selectable option 512-1 to view additional details associated with circuit BCBG15 NF00033.

Figure 6:
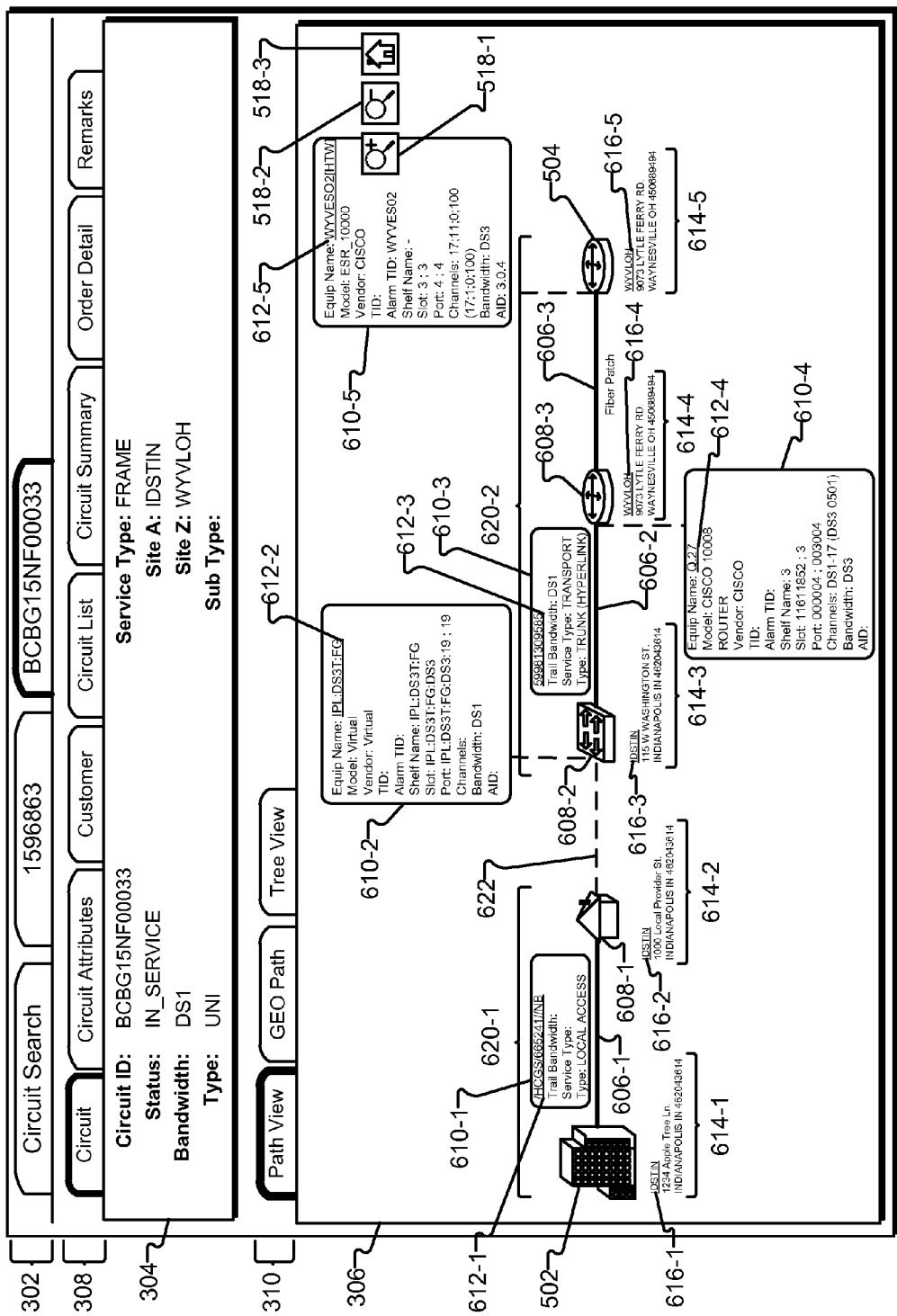

To illustrate, FIG. 6 shows an exemplary view of portal 300 after a user's selection of selectable option 512-1. As shown, in response to a user selection of selectable option 512-1, portal management facility 206 may be configured to open a new tab (i.e., a "BCBG15NF00033" tab) within control tabs 302 and associated with circuit BCBG15NF00033. With the "BCBG15NF00033" tab selected/active within control tabs 302, display windows 304 and 306 may be updated to include information and/or options associated with circuit BCBG15NF00033. For example, first display window 304 now includes information associated with circuit BCBG15NF00033 and second display window 306 now includes a graphical representation (e.g., a path view) of circuit BCBG15 NF00033.

In particular, second display window 306 includes graphical indicia of first endpoint 502, second endpoint 504, and a communication path representing circuit BCBG15NF00033 between first endpoint 502 and second endpoint 504. As shown, the communication path representing circuit BCBG15NF00033 may include a plurality of circuit segments 606-1 and 606-3 (collectively referred to herein as "circuit segments 606"). In the illustrated example, circuit segments 606-1 and 606-2 represent portions of circuit BCBG15NF00033 that ride on corresponding carrier circuits and circuit segment 606-3 represents a physical circuit segment (e.g., a fiber patch) connecting network element 608-3 to second endpoint 504. As further shown, the communication path representing circuit BCBG15NF00033 may also include a plurality of network elements 608-1 through 608-3 (collectively referred to herein as "network elements 608"). Network elements 608 may include any suitable network elements, such as disclosed herein.

Second display window 306 may also include information balloons 610-1 through 610-5 (collectively referred to herein as "information balloons 610") including corresponding selectable options 612-1 through 612-5 (collectively referred to herein as "selectable options 612") and site information 614-1 through 614-5 (collectively referred to herein as "site information 614") including corresponding selectable options 616-1 through 616-5 (collectively referred to herein as "selectable options 616"). Information balloons 610 and site information 614 may include any suitable information associated with first endpoint 502, second endpoint 504, circuit segments 606, and/or network elements 608, such as shown in FIG. 6 and/or otherwise disclosed herein. Additionally or alternatively, selectable options 612 and selectable options 616 may be configured to allow a user to access additional information associated with first endpoint 502, second endpoint 504, circuit segments 606, and/or network elements 608.

As shown in FIG. 6, circuit BCBG15NF00033 may include a first portion 620-1 and a second portion 620-2 connected to each other by way of communication link 622. In some examples, first portion 620-1 may represent a portion of circuit BCBG15NF00033 that is provisioned by a local service provider (e.g., within a particular LATA), and second portion 620-2 may represent a portion of circuit BCBG15NF00033 that is provisioned by a long-distance service provider. Additionally or alternatively, communication link 622 may facilitate the "hand off" of circuit BCBG15NF00033 from the local service provider to the long-distance service provider.

In some examples, a user may utilize the information and/or options included in second display window 306 to continue to drill down through additional circuits and/or other associated information. For example, a user may select selectable option 612-3 to access additional information associated with a circuit (i.e., circuit 59981309585) configured to carry circuit segment 606-2.

Figure 7:
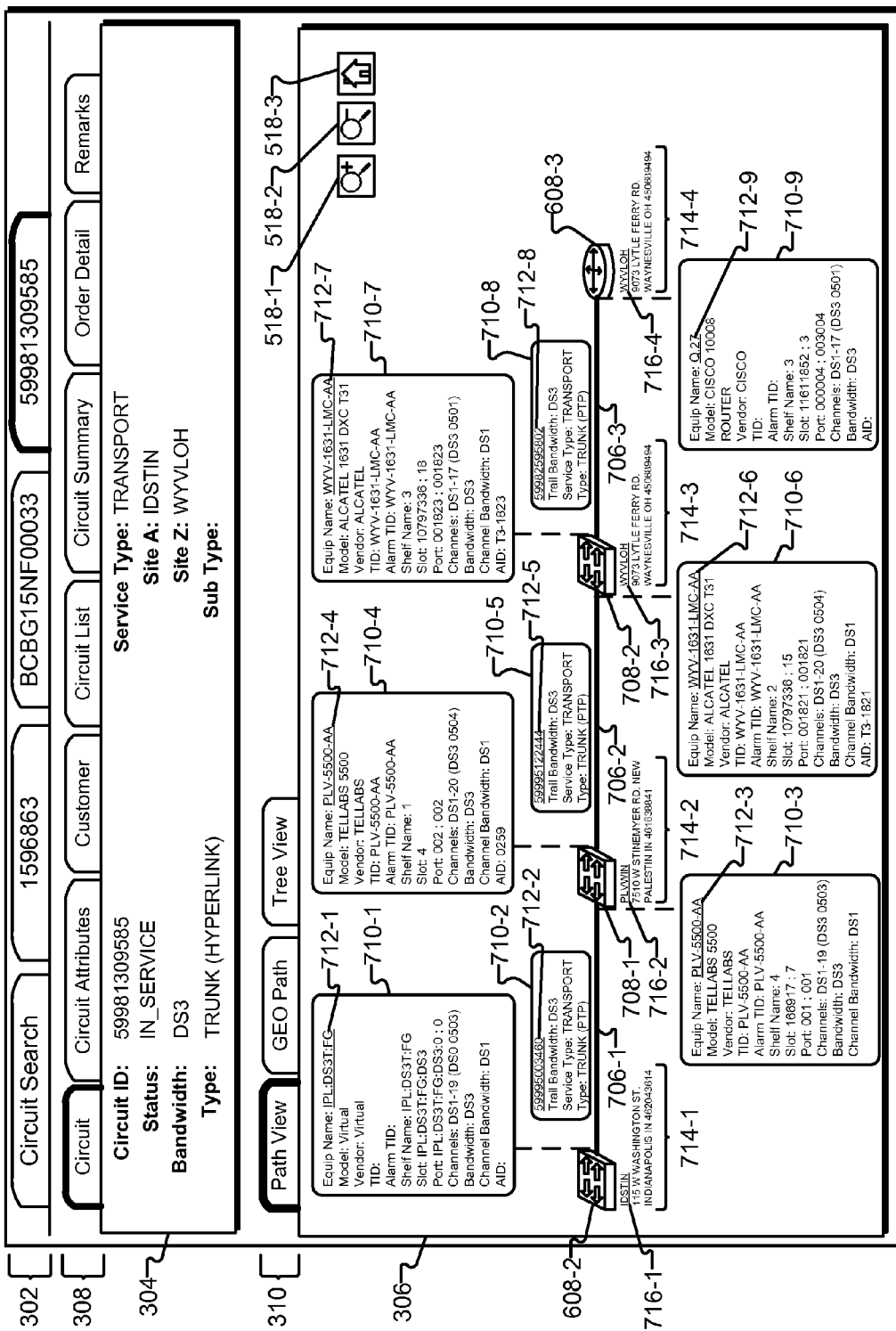

To illustrate, FIG. 7 shows an exemplary view of portal 300 following a user selection of selectable option 612-3. As shown, control tabs 302 now include a "59981309585" tab that is selectable by a user to access additional information and/or options associated with circuit 59981309585. With the "59981309585" tab selected/active, first display window 304 may be updated to include information associated with circuit 59981309585 and second display window 306 may be updated to include a graphical representation (e.g., a path view) of circuit 59981309585, as shown in FIG. 7.

For example, second display window 306 now includes graphical indicia of network element 608-2 (i.e., the first endpoint of circuit 59981309585), network element 608-3 (i.e., the second endpoint of circuit 59981309585), and a communication path between network element 608-2 and network element 608-3 representing circuit 59981309585. As shown, the communication path representing circuit 59981309585 may include a plurality of circuit segments 706-1 and 706-3 (collectively referred to herein as "circuit segments 706") and additional network elements 708-1 through 708-2 (collectively referred to herein as "network elements 708").

Second display window 306 also includes information balloons 710-1 through 710-9 (collectively referred to herein as "information balloons 710") including corresponding selectable options 712-1 through 712-9 (collectively referred to herein as "selectable options 712") and site information 714-1 through 714-4 (collectively referred to herein as "site information 714") including corresponding selectable options 716-1 through 716-4 (collectively referred to herein as "selectable options 716"). Information balloons 710 and/or site information 714 may each be associated with one or more of network element 608-2, network element 608-3, circuit segments 706, network elements 708, and/or any other aspect of circuit 59981309585. Additionally or alternatively, information balloons 710 and/or site information 714 may include any suitable information, such as shown in FIG. 7 and/or otherwise disclosed herein.

Selectable options 712 and selectable options 716 may be configured to allow a user to access additional information associated with network element 608-2, network element 608-3, circuit segments 706, and/or network elements 708. For example, a user may utilize selectable options 712 and/or selectable options 716 to continue to drill down through one or more additional circuits and/or other associated information using the same process and/or steps illustrated in FIGS. 5-7 and described above.

As mentioned above, a user may utilize first display tabs 308 to navigate and/or access information associated with a selected circuit by way of first display window 304. To illustrate, FIGS. 8-11 show exemplary views of portal 300 as a user navigates through a sampling of first display tabs 308 to access additional information and/or options associated with circuit 59981309585.

Figure 8:
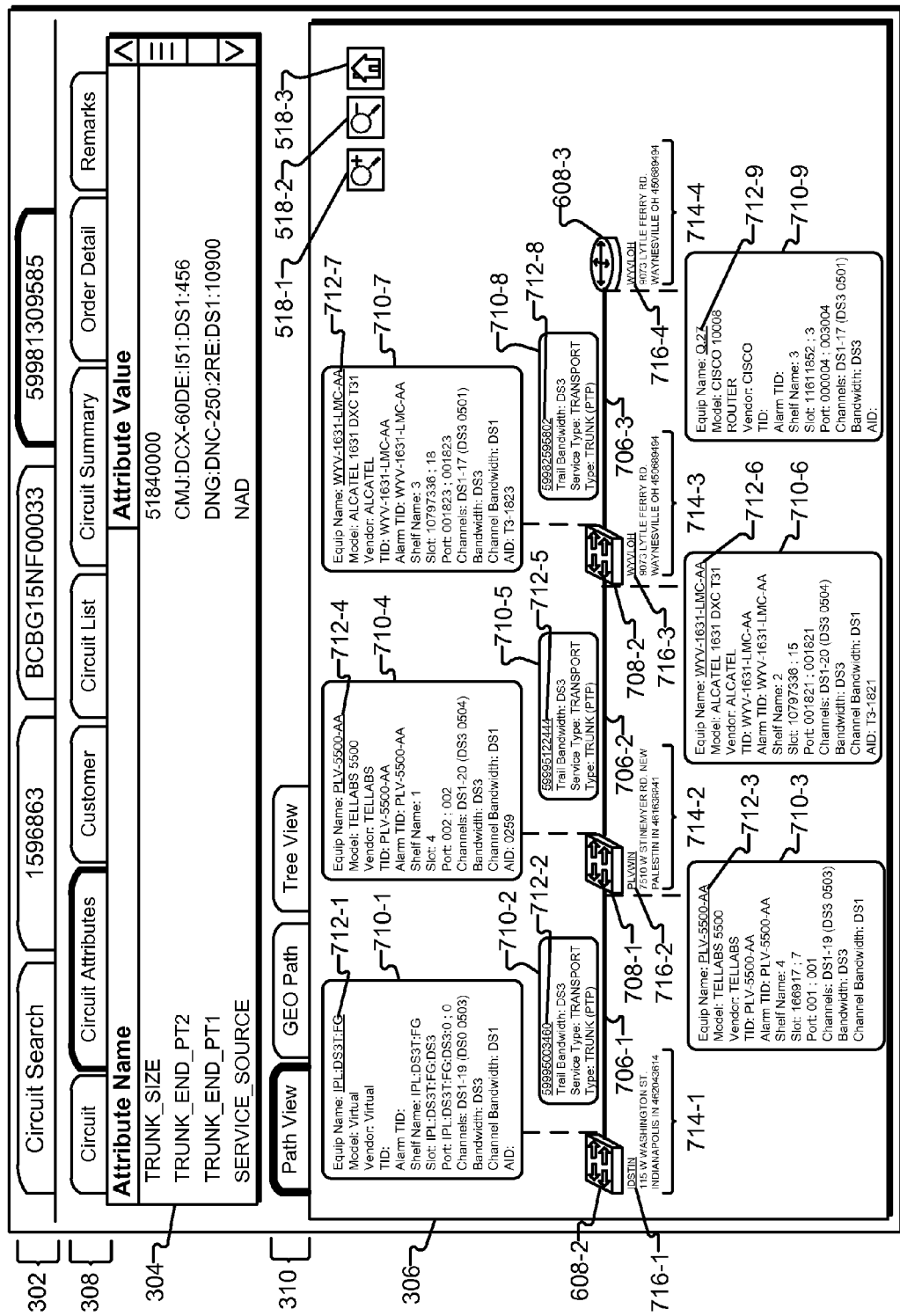

FIG. 8 shows an exemplary view of portal 300 with the "Circuit Attributes" tab selected within first display tabs 308. With the "Circuit Attributes" tab selected, first display window 304 may include a listing of one or more attribute names and corresponding attribute values. For example, first display window 304 may include any suitable attribute names and/or corresponding attribute values associated with circuit 59981309585. In some examples, the attribute names and/or attribute values included in the first display window 304 may represent data received from one or more backend telecommunications subsystems (e.g., from backend telecommunications subsystems 104) and/or representative of information associated with circuit 59981309585.

Figure 9:
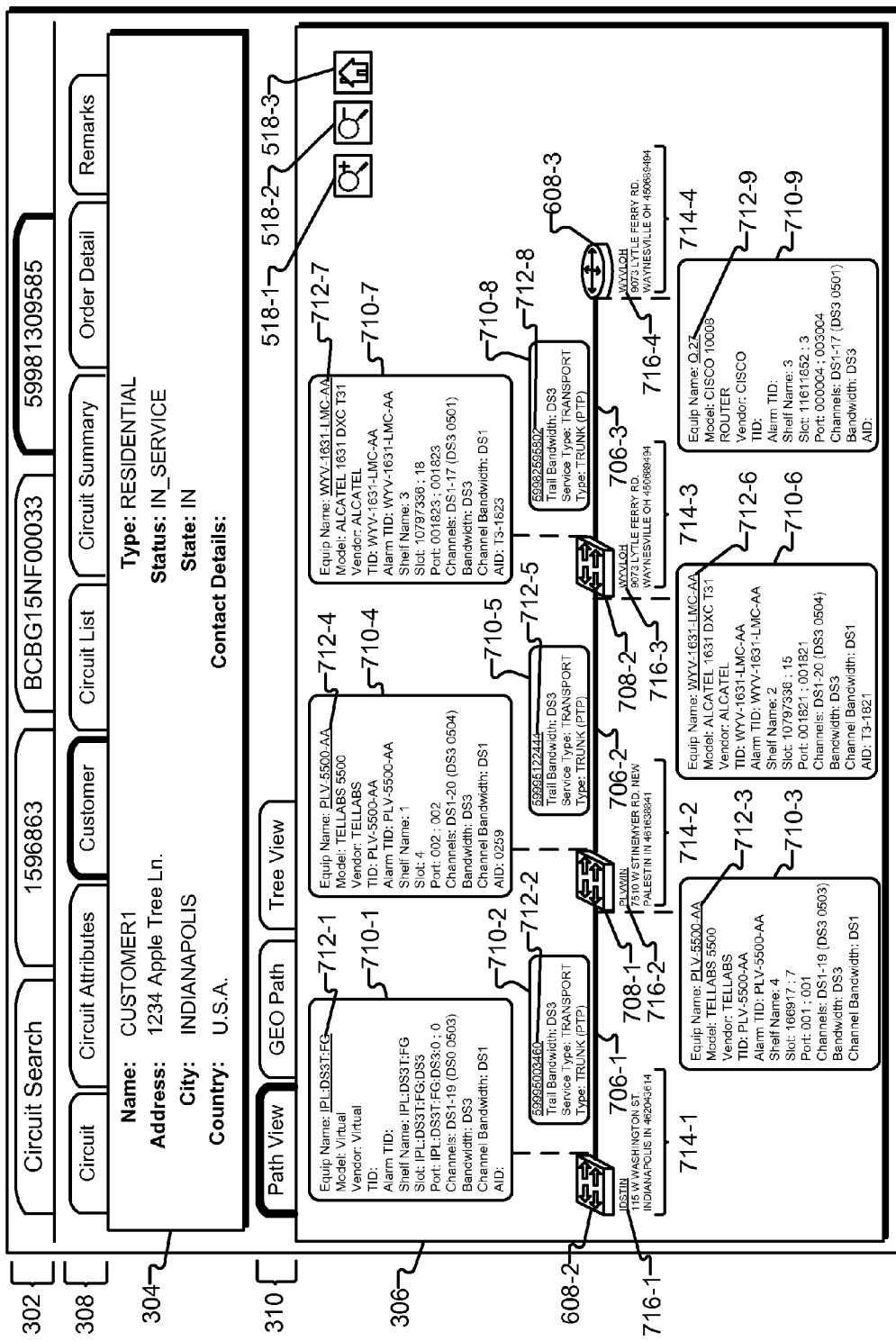

FIG. 9 shows an exemplary view of portal 300 with the "Customer" tab selected within first display tabs 308. With the "Customer" tab selected, first display window 304 may include any suitable information associated with a customer that utilizes circuit 59981309585. For example, first display window 304 may include any suitable information associated with the customer (e.g., contact information) and/or a telecommunications service provided to the customer (e.g., a service type and status).

Figure 10:
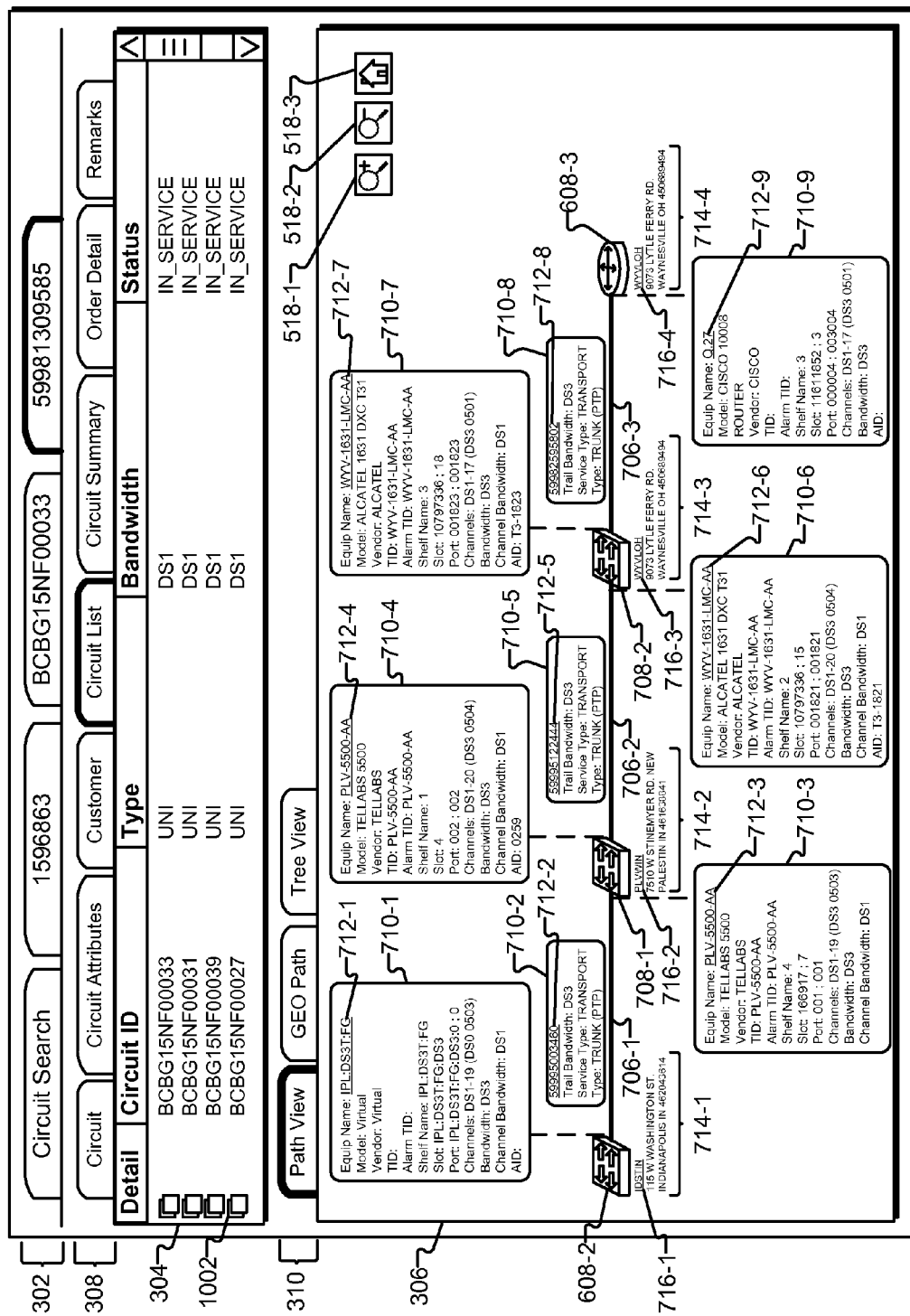

FIG. 10 shows an exemplary view of portal 300 with the "Circuit List" tab selected within first display tabs 308. With the "Circuit List" tab selected, first display window 304 may include a listing of one or more telecommunications circuits that ride on circuit 59981309585 and/or any suitable information associated with the listed circuits. For example, first display window 304 may include a circuit ID, a type, a bandwidth, a status, and/or any other suitable information associated with each circuit that is carried by circuit 59981309585. Additionally or alternatively, first display window 304 may include one or more selectable options associated with each listed circuit and configured to allow a user to access additional information associated with the corresponding circuit. For example, first display window 304 includes a selectable option 1002 associated with a listed circuit BCBG15NF00027 and configured to allow a user to access additional information associated with circuit BCBG15NF00027. In some examples, a user may utilize the information and/or options included within first display window 304 to drill up through one or more circuits (e.g., to drill up through rider circuits).

Figure 11:
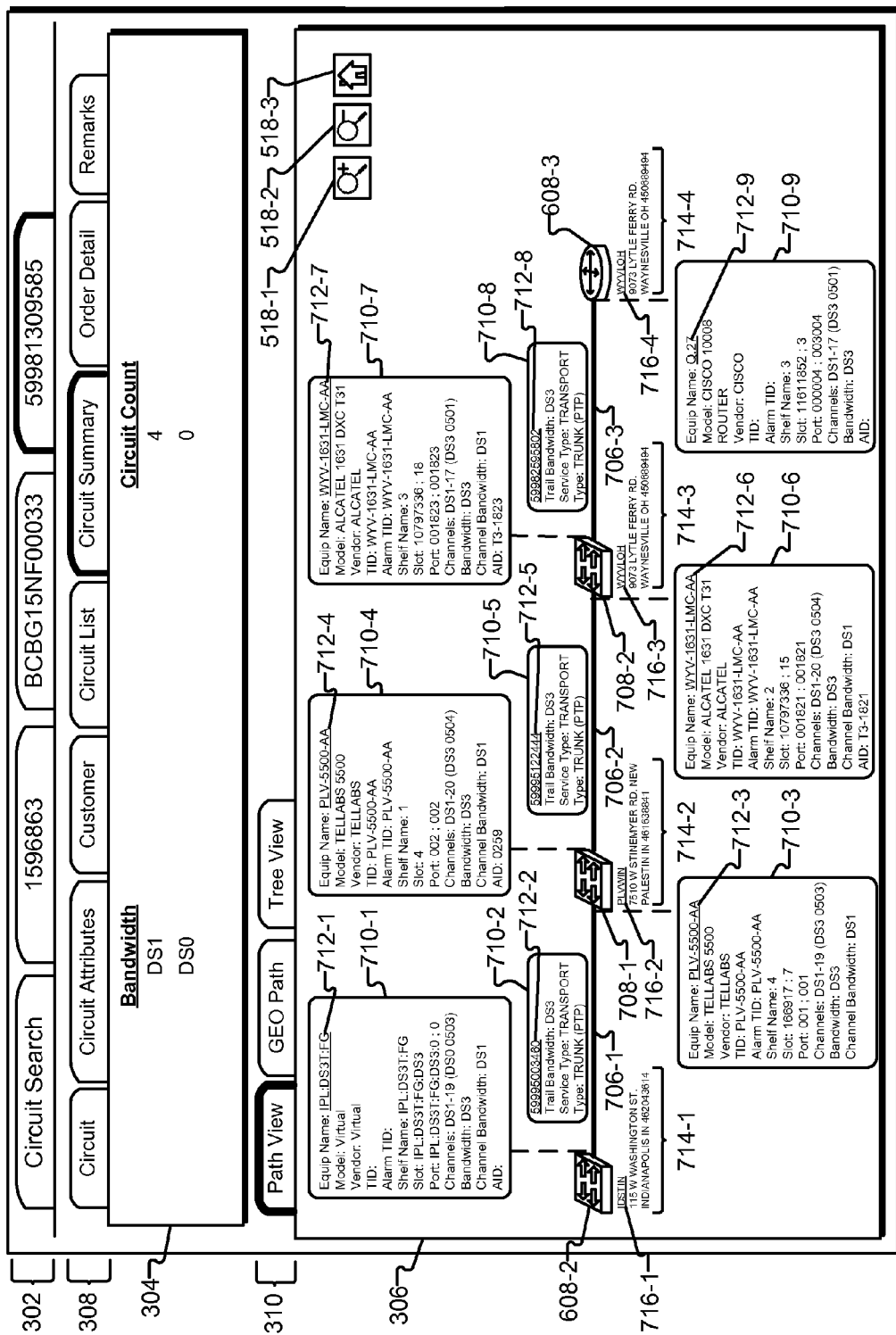

FIG. 11 illustrates an exemplary view of portal 300 with the "Circuit Summary" tab selected within first display tabs 308. With the "Circuit Summary" tab selected, first display window 304 may include a summary of telecommunications circuits that ride on circuit 59981309585. For example, first display window 304 may list one or more types of telecommunications circuits and a corresponding number representing the number of that type of circuit that is carried by circuit 59981309585.

As shown, first display tabs 308 may include additional tabs (e.g., an "Order Detail" tab and a "Remarks") that a user may utilize to navigate additional information associated with circuit 59981309585 and available by way of first display window 304. In additional or alternative examples, first display tabs 308 may include any other suitable tabs and first display window 304 may be configured to display any other suitable information, as may serve a particular implementation.

As mentioned above, a user may utilize second display tabs 310 to navigate and/or access additional information and/or options associated with a selected circuit by way of second display window 306. To illustrate, FIGS. 12-13 show exemplary views of portal 300 as a user navigates through second display tabs 310 to access additional information associated with circuit 59981309585.

Figure 12:
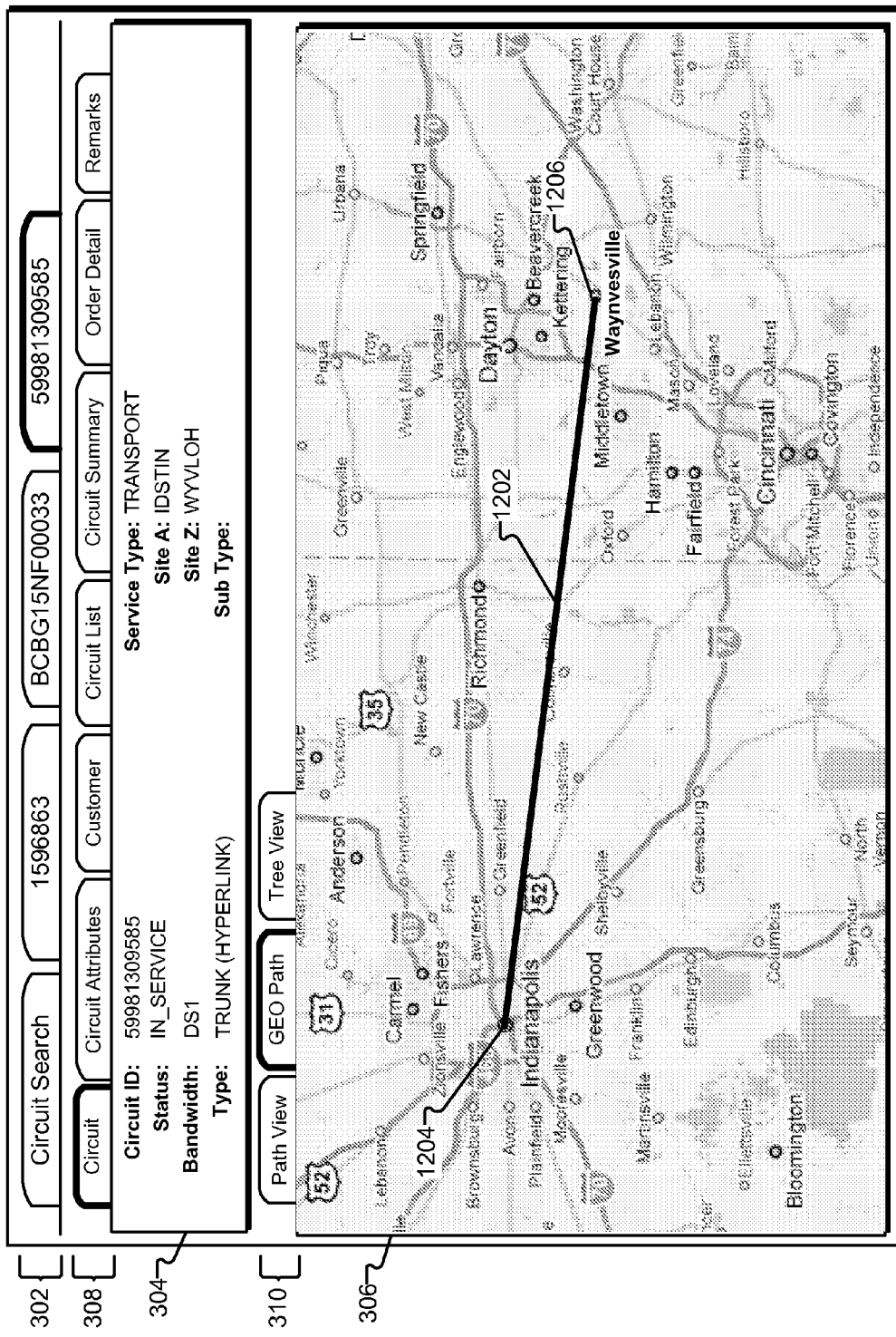

FIG. 12 illustrates an exemplary view of portal 300 with the "GEO Path" tab selected within second display tabs 310. With the "GEO Path" tab selected, second display window 306 may include a geographical representation of circuit 59981309585. For example, as shown in FIG. 12, second display window includes a graphical line 1202 overlaid on a map and connecting a first location 1204 (e.g., the location of the first endpoint of circuit 59981309585) and a second location 1206 (e.g., the location of the second endpoint of circuit 59981309585). Although graphical line 1202 is shown as following a direct path between first location 1204 and second location 1206, in additional or alternative embodiments, graphical line 1202 may be configured to follow the actual physical path followed by circuit 59981309585 between first location 1204 and second location 1206. FIG. 12 is provided for illustrative purposes only. In additional or alternative examples, second display window 306 may be configured to include any other suitable graphical representation of a geographical path of a telecommunications circuit.

Figure 13:
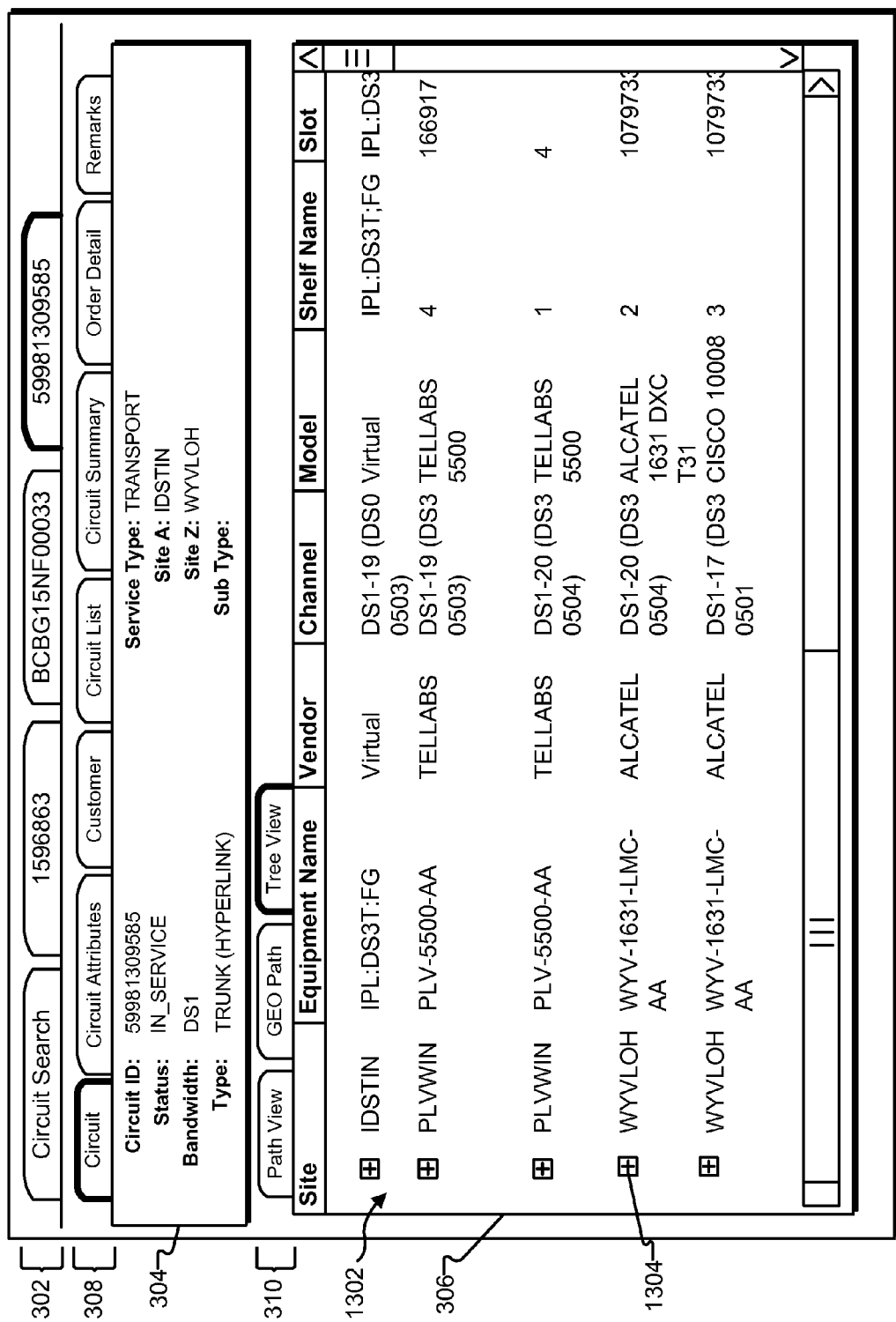

FIG. 13 shows an exemplary view of portal 300 with the "Tree View" tab selected within the second display tabs 310. With the "Tree View" tab selected, second display window 306 may be configured to include tree view (e.g., a tree-like graphical representation) of circuit 59981309585. For example, the tree view may include a listing 1302 of information associated with circuit 59981309585. Listing 1302 may be organized in any suitable manner to display the information associated with circuit 59981309585. In some examples, listing 1302 may have a hierarchal and/or tree-like organization. Additionally or alternatively, listing 1302 may be configured to be expandable and/or collapsible. For example, second display window 306 may include one or more selectable options associated with each entry in listing 1302 and configured to allow a user to expand the entry to access additional information associated with the entry. To illustrate, second display window 306 shows an exemplary selectable option 1304 corresponding to the fourth entry in listing 1302 and that may be selected by a user to expand and access additional information associated with the corresponding entry. As listing 1302 is expanded, additional selectable options may appear to allow a user for further expand and/or to collapse listing 1302. The exemplary tree view of FIG. 13 is provided for illustrative purposes only. In additional or alternative examples, second display window 306 may be configured to include any other suitable tree view of a telecommunications circuit.

Figure 14:
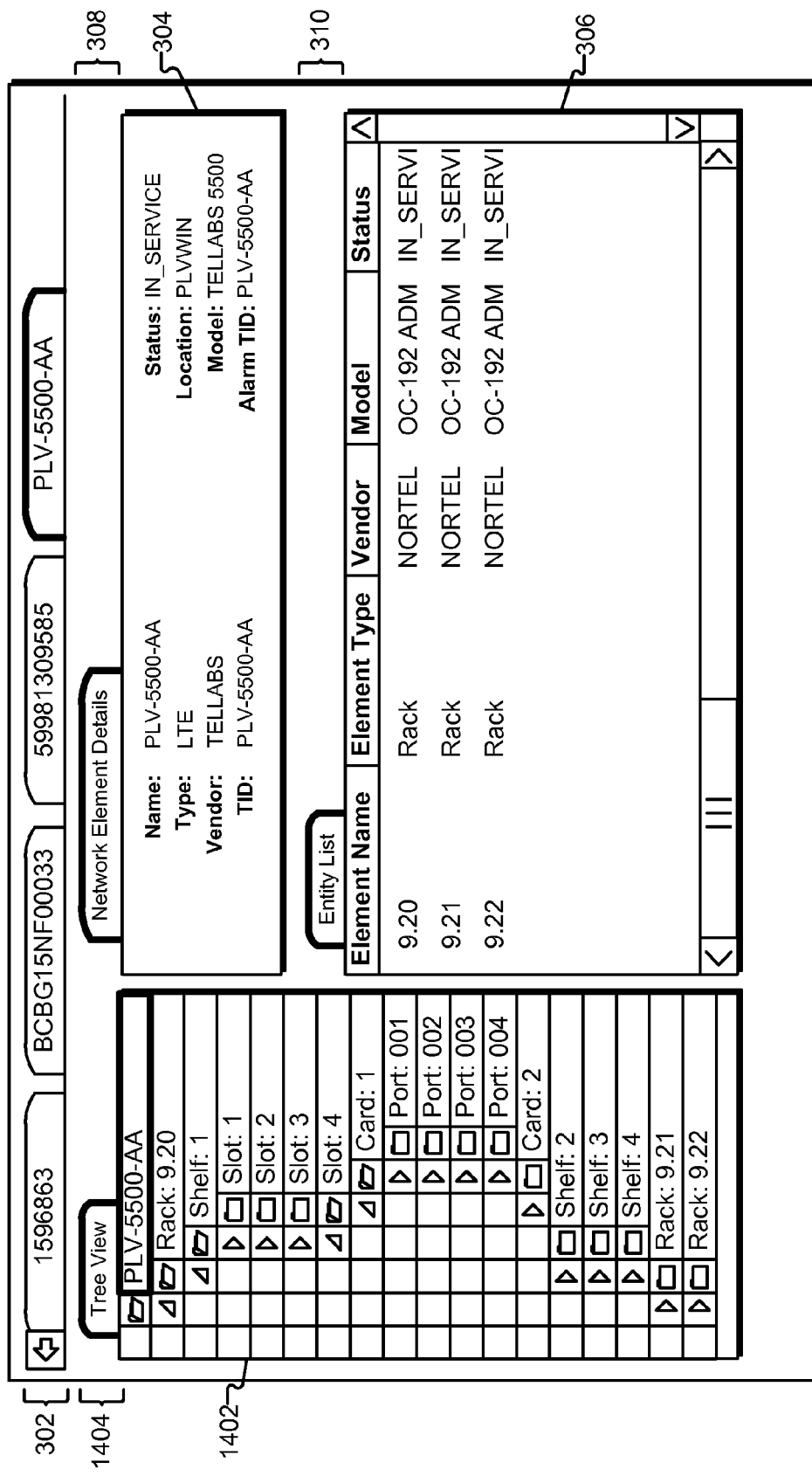

As mentioned above, a user may utilize one or more selectable options available by way of portal 300 to access additional information associated with a particular network element. For example, and referring again to FIG. 7, a user may select selectable option 712-3 or selectable option 712-4 to access additional information associated with network element 708-1. To illustrate, FIG. 14 shows an exemplary view of portal 300 after a user selection of selectable option 712-3 or selectable option 712-4. As shown, in response to the user selection, portal management facility 206 may be configured to open a new tab (i.e., a "PLV-5500-AA" tab) within control tabs 302 associated with the network element 708-1 (or "network element PLV-5500-AA"). With the "PLV-5500-AA" tab selected, display windows 304 and 306 and display tabs 308 and 310 may be updated to allow a user to access additional information associated with network element PLV-5500-AA. For example, first display window 304 and first display tabs 308 may be configured to allow a user to view "Network Element Details" associated with network element PLV-5500-AA. Second display window 306 and second display tabs 310 may be configured to allow a user to view an "Entity List" of one or more entities (e.g., one or more racks) associated with network element PLV-5500-AA.

As shown in FIG. 14, portal 300 may also include a third display window 1402 and third display tabs 1404 that may be utilized by a user to access a "Tree View" of and/or navigate within additional information associated with network element PLV-5500-AA. For example, third display window 1402 may include an expandable/collapsible listing of entities (e.g., racks, shelves, slots, cards, and/or ports) associated with network element PLV-5500-AA.

In some examples, a user may select any item listed in third display window 1402 to access additional information associated with the selected item. Additionally or alternatively, a selected item within third display window 1402 may be highlighted and/or bolded to visually distinguish the selected item from other items listed in third display window 1402. In some examples, first display window 304 and second display window 306 may be configured to display information associated with a selected item within third display window 1402. For example, as shown in FIG. 14, with "PLV-5500-AA" selected within third display window 1402, first display window 304 and second display window 306 may display information associated with network element PLV-5500-AA.

Figure 15:
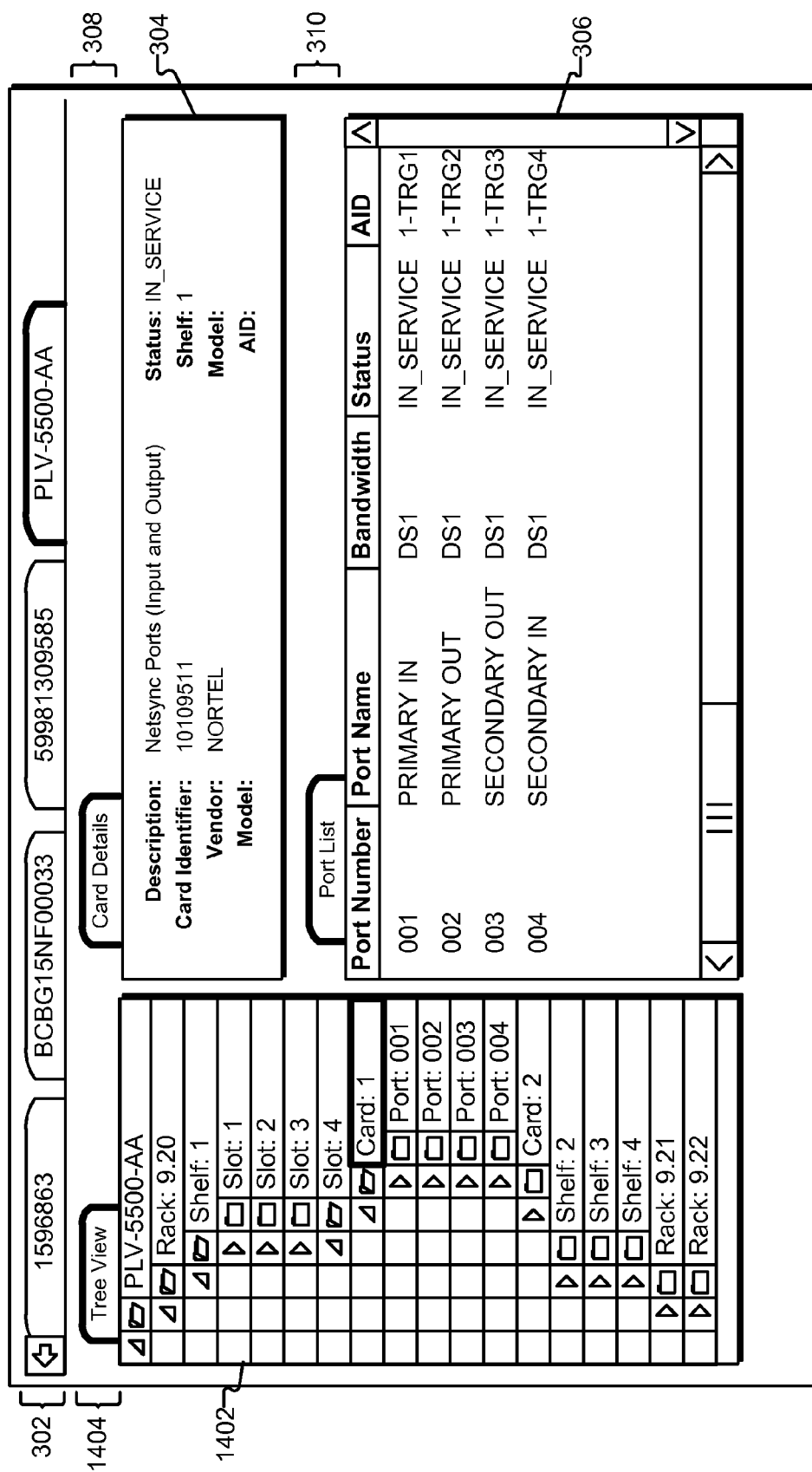

If a user selects another item within third display window 1402, first display window 304 and second display window 306 may be updated to include information associated with the newly selected item. To illustrate, FIG. 15 shows an exemplary view of portal 300 with "Card: 1" (e.g., within "Slot 4" of "Shelf: 1" of "Rack: 9.20") selected. With "Card: 1" selected, first display window 304 may be updated to include "Card Details" associated with "Card: 1" and/or second display window 306 may be updated to include a listing of ports within "Card: 1." A user may further navigate third display window 1402 to access additional information associated with any item listed in third display window 1402.

Figure 16:
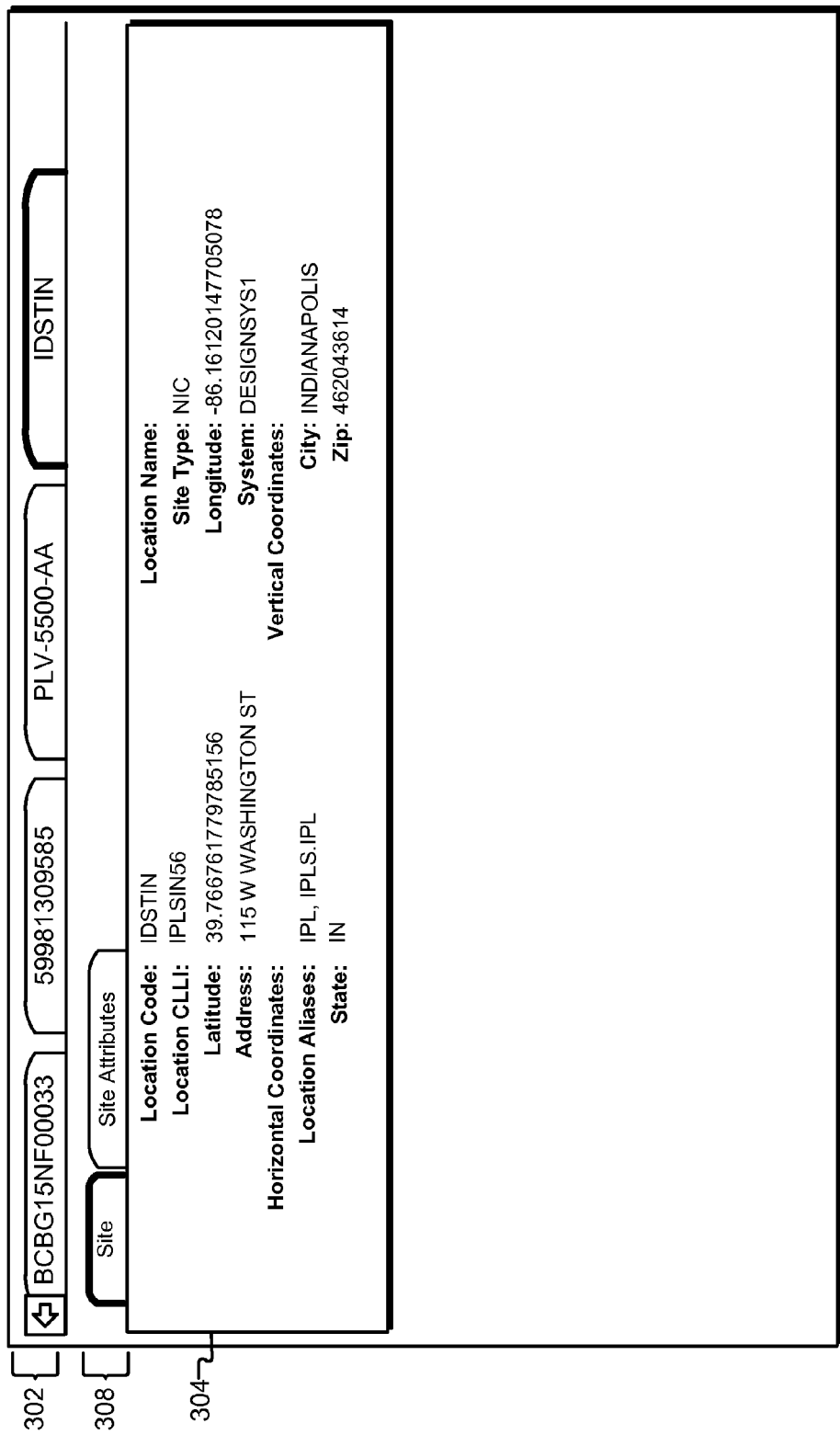

As mentioned above, a user may utilize one or more selectable options available by way of portal 300 to access additional information associated with sites within a particular telecommunication circuit. For example, and referring again to FIG. 7, a user may utilize selectable option 716-1 to access additional information associated with the corresponding site (i.e., site IDSTIN). To illustrate, FIG. 16 shows an exemplary view of portal 300 after a user selection of selectable option 716-1. As shown, in response to the user selection, portal management facility 206 may open an "IDSTIN" tab within control tabs 302 and selectable to access additional information associated with site IDSTIN. With the "IDSTIN" tab selected, first display window 304 and first display tabs 308 may be configured to allow a user to navigate and/or access additional information associated with site IDSTIN. For example, first display tabs 308 may include a "Site" tab configured to allow a user to access general information associated with site IDSTIN and a "Site Attributes" tab configured to allow a user to access attributes associated with site IDSTIN. With the "Site" tab selected, first display window 304 may include any suitable information associated with site IDSTIN. For example, first display window may include a "Location Code," a "Location Name," a "Location CLLI," a "Site Type," a "Latitude," a "Longitude," an "Address," a "System," "Horizontal Coordinates," "Vertical Coordinates," "Location Aliases," a "City," a "State," a "Zip," and/or any other suitable information associated with site IDSTIN.

The exemplary views shown in FIGS. 3-16 are provided for illustrative purposes only. Portal 300 may be modified, redacted, and/or added to in any suitable manner to include any other suitable information and/or options, as may serve a particular implementation.

Portal 300 may be utilized by one or more users to more efficiently access, manage, and/or monitor information associated with one or more telecommunications circuits. For example, a customer may utilize portal 300 to access a unified view of a complete set of information associated with a telecommunications circuit and/or service provided to the customer by a telecommunications service provider.

Figure 17:
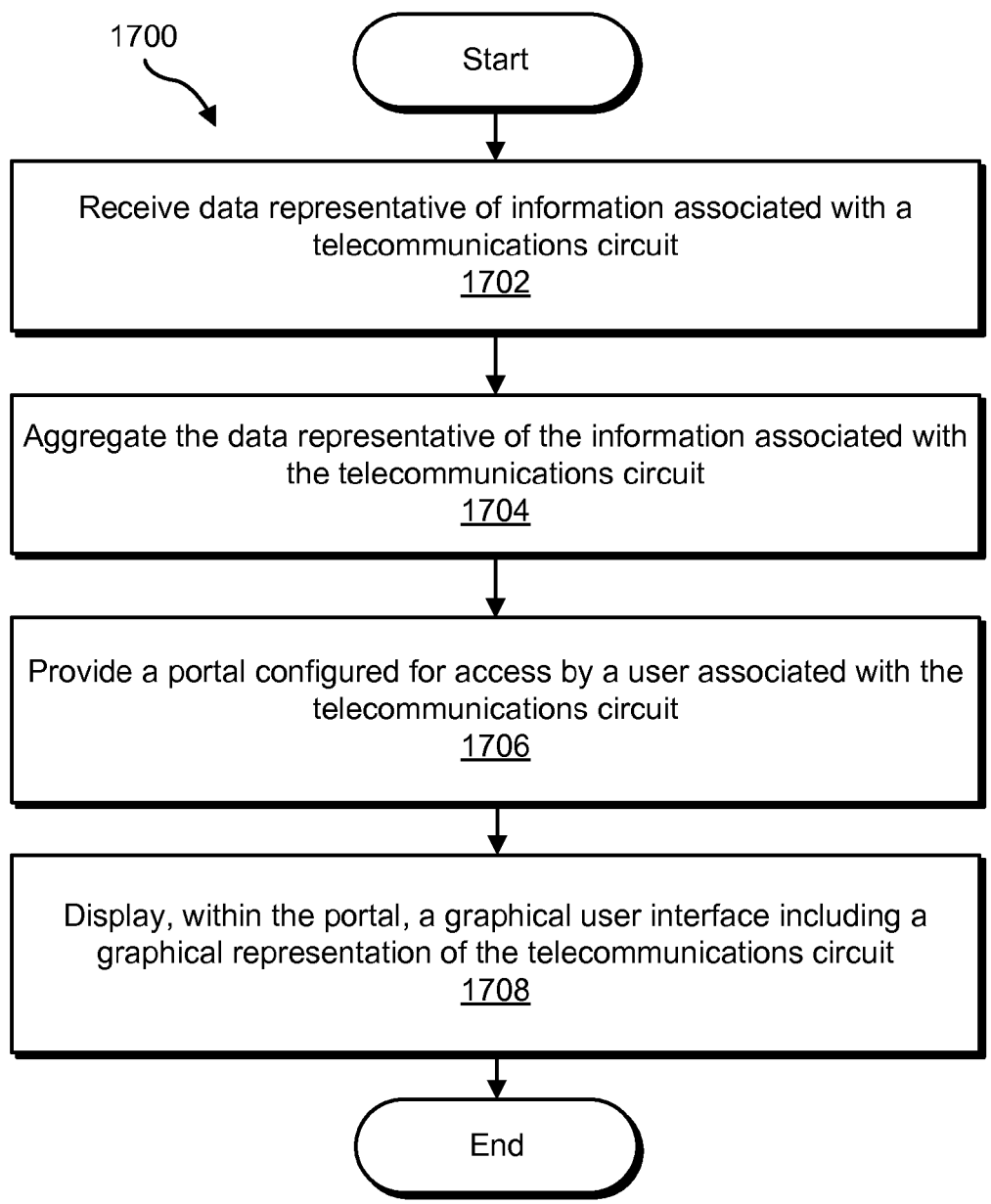
FIG. 17 illustrates an exemplary method according to principles described herein.

FIG. 17 illustrates an exemplary method 1700 of managing telecommunications. While FIG. 17 illustrates exemplary steps according to one embodiment, other embodiments may omit, add to, reorder, and/or modify any of the steps shown in FIG. 17. The steps shown in FIG. 17 may be performed by any component of telecommunications management subsystem 102.

In step 1702, a telecommunications management subsystem receives data representative of information associated with a telecommunications circuit. The data may be received in any suitable manner and/or from any suitable source, such as disclosed herein. For example, communication facility 202 may receive the data from backend telecommunications subsystems 104.

In step 1704, the telecommunications management subsystem aggregates the data representative of the information associated with the telecommunications circuit. The data may be aggregated in any suitable manner, such as disclosed herein. For example, aggregation facility 204 may be configured to aggregate data received from backend telecommunications subsystems 104.

In step 1706, the telecommunications management subsystem provides a portal for access by a user associated with the telecommunications circuit. The portal may be provided in any suitable manner, such as disclosed herein. For example, portal management facility 206 may be configured to provide the portal for access by an end user (e.g., a customer) associated with the telecommunications circuit.

In step 1708, the telecommunications management subsystem displays, within the portal, a graphical user interface including a graphical representation of the telecommunications circuit. The graphical user interface including the graphical representation of the telecommunications circuit may be displayed in any suitable manner, such as disclosed herein. For example, portal management facility 206 may display a path view of a telecommunications circuit within the portal.

Figure 18:
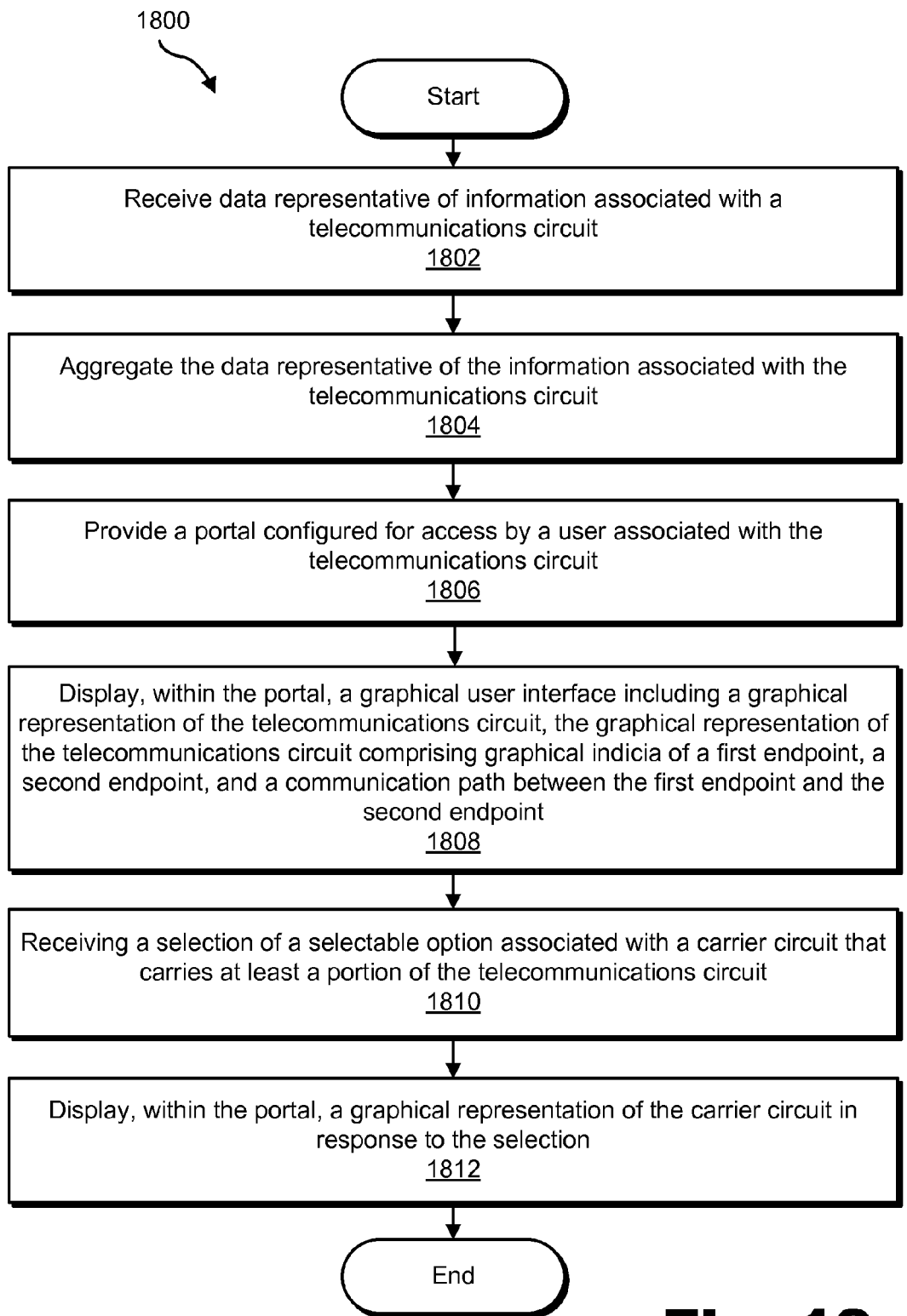
FIG. 18 illustrates another exemplary method according to principles described herein.

FIG. 18 illustrates another exemplary method 1800 of managing telecommunications. While FIG. 18 illustrates exemplary steps according to one embodiment, other embodiments may omit, add to, reorder, and/or modify any of the steps shown in FIG. 18. The steps shown in FIG. 18 may be performed by any component of telecommunications management subsystem 102.

In step 1802, a telecommunications management subsystem receives data representative of information associated with a telecommunications circuit. The data may be received in any suitable manner and/or from any suitable source, such as disclosed herein.

In step 1804, the telecommunications management subsystem aggregates the data representative of the information associated with the telecommunications circuit. The data may be aggregated in any suitable manner, such as disclosed herein.

In step 1806, the telecommunications management subsystem provides a portal for access by a user associated with the telecommunications circuit. The portal may be provided in any suitable manner, such as disclosed herein.

In step 1808, the telecommunications management subsystem displays, within the portal, a graphical user interface including a graphical representation of the telecommunications circuit. In some examples, the graphical representation of the telecommunications circuit may include graphical indicia of a first endpoint, a second endpoint, and a communication path between the first endpoint and the second endpoint. The graphical user interface including the graphical representation of the telecommunications circuit may be displayed in any suitable manner, such as disclosed herein.

In step 1810, the telecommunications management subsystem receives a selection of a selectable option associated with a carrier circuit that carries at least a portion of the telecommunications circuit. The selection may be received in any suitable manner, such as disclosed herein.

In step 1812, the telecommunications management subsystem displays, within the portal, a graphical representation of the carrier circuit in response to the selection. The graphical representation of the carrier circuit may be displayed in any suitable manner, such as disclosed herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 19:
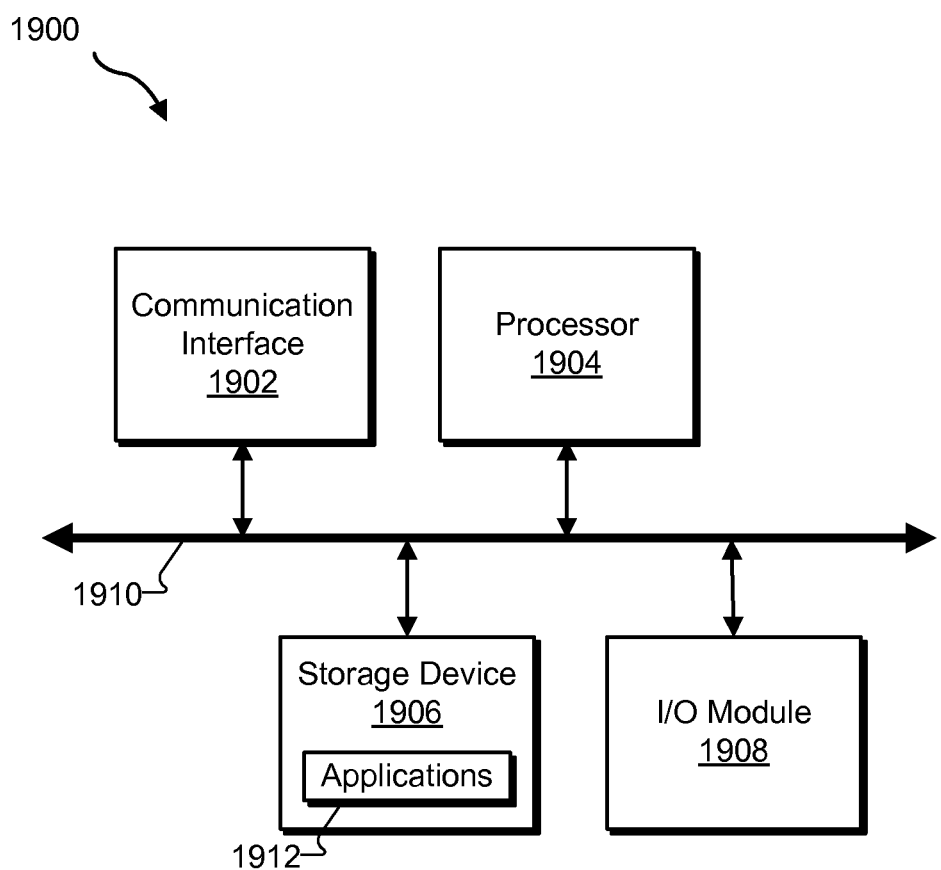
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1908 communicatively connected via a communication infrastructure 1910. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, and any other suitable interface. In at least one embodiment, communication interface 1902 may provide a direct connection between system 100 and one or more of provisioning systems via a direct link to a network, such as the Internet. Communication interface 1902 may additionally or alternatively provide such a connection through, for example, a local area network (such as an Ethernet network), a personal area network, a telephone or cable network, a satellite data connection, a dedicated URL, or any other suitable connection. Communication interface 1902 may be configured to interface with any suitable communication media, protocols, and formats, including any of those mentioned above.

Processor 1904 generally represents any type or form of processing unit capable of processing data or interpreting, executing, and/or directing execution of one or more of the instructions, processes, and/or operations described herein. Processor 1904 may direct execution of operations in accordance with one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1906. For example, data representative of one or more executable applications 1912 (which may include, but are not limited to, one or more of the software applications described herein) configured to direct processor 1904 to perform any of the operations described herein may be stored within storage device 1906. In some examples, data may be arranged in one or more databases residing within storage device 1906.

I/O module 1908 may be configured to receive user input and provide user output and may include any hardware, firmware, software, or combination thereof supportive of input and output capabilities. For example, I/O module 1908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1900. For example, one or more applications 1912 residing within storage device 1906 may be configured to direct processor 1904 to perform one or more processes or functions associated with communication facility 202, aggregation facility 204, and/or portal management facility 206. Likewise, storage facility 206 may be implemented by or within storage device 1906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a telecommunications management subsystem from a plurality of backend telecommunications subsystems, data representative of information associated with a telecommunications circuit between a first endpoint at a first geographic location and a second endpoint at a second geographic location;
aggregating, by the telecommunications management system, the data representative of the information associated with the telecommunications circuit;
providing, by the telecommunications management system, a portal configured for access by a user associated with the telecommunications circuit; and
detecting, by the telecommunications management system, a user selection, via the portal, of at least the second endpoint at the second geographic location by the user associated with the telecommunications circuit;
displaying, by the telecommunications management subsystem within the portal in response to the user selection, a graphical user interface including a graphical representation of the telecommunications circuit, the graphical representation of the telecommunications circuit including a plurality of network elements within the graphically represented circuit and at least one selectable option, selectable by the user, and configured to provide additional information about at least one of the plurality of network elements, the additional information comprising site information about the at least one of the plurality of network elements, the site information identifying at least a geographical address of the at least one of the plurality of network elements included in the graphical representation of the telecommunications circuit.

2. The method of claim 1, wherein the graphical representation of the telecommunications circuit comprises graphical indicia of the first endpoint, the second endpoint, and a communication path between the first endpoint and the second endpoint.

3. The method of claim 2, wherein the communication path includes a plurality of circuit segments.

4. The method of claim 3, wherein at least one circuit segment within the plurality of circuit segments represents a portion of the telecommunications circuit that rides on a carrier circuit.

5. The method of claim 4, wherein the graphical user interface includes an additional selectable option associated with the carrier circuit, the method further comprising:
receiving, by the telecommunications management system, a selection of the additional selectable option; and
displaying, by the telecommunication management system within the portal, a graphical representation of the carrier circuit in response to the selection.

6. The method of claim 2, wherein the communication path traverses at least one network element.

7. The method of claim 6, further comprising:
receiving, by the telecommunications management system, a selection of the at least one selectable option; and
displaying, by the telecommunications management subsystem within the portal, the additional information about the at least one of the plurality of network elements in response to the selection and within an information balloon associated with the at least one of the plurality of network elements.

8. The method of claim 6, wherein the at least one network element comprises at least one of a switch device, a router device, a digital cross-connect device, a gateway device, a hub device, and a repeater device.

9. The method of claim 1, wherein the graphical representation of the telecommunications circuit comprises graphical indicia of the communication path overlaid on a geographical map.

10. The method of claim 9, wherein the graphical indicia comprise a line connecting the first geographical location to the second geographical location on the geographical map.

11. The method of claim 1, wherein the graphical representation of the telecommunications circuit comprises a tree view of the telecommunications circuit.

12. The method of claim 11, wherein the tree view comprises an expandable and collapsible listing of the information associated with the telecommunications circuit.

13. The method of claim 1, wherein the aggregating the data representative of the information associated with the telecommunications circuit comprises aggregating data across at least one of a plurality of open systems interconnection ("OSI") service layers, a plurality of network elements, a plurality of circuit segments, and plurality of sites.

14. The method of claim 1, wherein the aggregating the data representative of the information associated with the telecommunications circuit comprises translating the data representative of the information associated with the telecommunications circuit from a plurality of distinct data models associated with the plurality of backend telecommunications subsystems into a common data model.

15. The method of claim 1, wherein the plurality of backend telecommunications subsystems comprise at least one of a backend provisioning subsystem, a backend network design subsystem, a backend ordering subsystem, a backend service profile subsystem, and a backend network management subsystem.

16. The method of claim 1, wherein at least one backend telecommunications subsystem within the plurality of backend telecommunications subsystems is incapable of exchanging information with at least one other backend telecommunications subsystem within the plurality of backend telecommunications subsystems.

17. The method of claim 1, wherein each backend telecommunications subsystem within the plurality of backend telecommunications subsystems is associated with at least one of layer 1 services, layer 2 services, layer 3 services, and layer 4 services.

18. The method of claim 1, wherein the telecommunications circuit is a point-to-point circuit.

19. The method of claim 1, wherein the telecommunications circuit is a dedicated or private circuit.

20. The method of claim 1, wherein the user is an end user of the telecommunications circuit.

21. The method of claim 1, embodied as computer-executable instructions on at least one non-transitory computer-readable medium.

22. A method comprising:
receiving, by a telecommunications management subsystem from a plurality of backend telecommunications subsystems, data representative of information associated with a telecommunications circuit between a first endpoint at a first geographic location and a second endpoint at a second geographic location;
aggregating, by the telecommunications management system, the data representative of the information associated with the telecommunications circuit;
providing, by the telecommunications management system, a portal configured for access by a user associated with the telecommunications circuit;
detecting, by the telecommunications management system, a user selection, via the portal, of at least the second endpoint at the second geographic location by the user associated with the telecommunications circuit;
displaying, by the telecommunications management subsystem within the portal in response to the user selection, a graphical user interface including a graphical representation of the telecommunications circuit, the graphical representation of the telecommunications circuit comprising graphical indicia of the first endpoint, the second endpoint, a communication path between the first endpoint and the second endpoint, a plurality of network elements within the graphically represented circuit and at least one selectable option, selectable by the user, and configured to provide additional information about at least one of the first end point, the second endpoint, and at least one of the plurality of network elements, the site information identifying at least a geographical address of at least one of the first end point, the second endpoint, and the at least one of the plurality of network elements included in the graphical representation of the telecommunications circuit;
receiving, by the telecommunications management system, a selection of an additional selectable option associated with a carrier circuit that carries at least a portion of the telecommunications circuit; and
displaying, by the telecommunications management subsystem within the portal, a graphical representation of the carrier circuit in response to the selection of the additional selectable option.

23. The method of claim 22, further comprising:
receiving, by the telecommunications management system, a selection of another additional selectable option associated with an additional carrier circuit that carries at least a portion of the carrier circuit; and
displaying, by the telecommunications management subsystem within the portal, a graphical representation of the additional carrier circuit in response to the selection of the another additional selectable option.

24. A system comprising:
a communication facility configured to receive data representative of information associated with a telecommunications circuit from a plurality of backend telecommunications subsystems, the telecommunications circuit configured to connect a first endpoint at a first geographic location and a second endpoint at a second geographic location;

a data aggregation facility communicatively coupled to the communication facility and configured aggregate the data representative of the information associated with the telecommunications circuit; and a portal management facility communicatively coupled to the data aggregation facility and configured to:
provide a portal for access by a user associated with the telecommunications circuit,
detect, a user selection, via the portal, of at least the second endpoint at the second geographic location by the user associated with the telecommunications circuit, and
display within the portal and in response to the user selection, a graphical user interface including a graphical representation of the telecommunications circuit, the graphical representation of the telecommunications circuit including a plurality of network elements within the graphically represented circuit and at least one selectable option, selectable by the user, and configured to provide additional information about at least one of the plurality of network elements, the additional information comprising site information about the at least one of the plurality of network elements, the site information identifying at least a geographical address of the at least one of the plurality of network elements included in the graphical representation of the telecommunications circuit.

25. The system of claim 24, wherein the portal management facility is further configured to allow the user to, by way of the portal, drill down or up through the data representative of the information associated with the telecommunications circuit.

* * * * *